(12) United States Patent
Tani et al.

(10) Patent No.: US 12,710,155 B2
(45) Date of Patent: Aug. 18, 2026

(54) LAMP FOR DRAWING

(71) Applicant: KOITO MANUFACTURING CO., LTD., Tokyo (JP)

(72) Inventors: Kentaro Tani, Shizuoka (JP); Kenichi Motomura, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 19/113,275

(22) PCT Filed: Sep. 20, 2023

(86) PCT No.: PCT/JP2023/034151

§ 371 (c)(1),
(2) Date: Mar. 19, 2025

(87) PCT Pub. No.: WO2024/063104

PCT Pub. Date: Mar. 28, 2024

(65) Prior Publication Data

US 2026/0098623 A1 Apr. 9, 2026

(30) Foreign Application Priority Data

Sep. 21, 2022 (JP) ................................ 2022-150307
Sep. 21, 2022 (JP) ................................ 2022-150308

(51) Int. Cl.
*F21S 43/20* (2018.01)
*B60Q 1/34* (2006.01)
(Continued)

(52) U.S. Cl.
CPC .......... *F21S 43/26411* (2024.05); *B60Q 1/34* (2013.01); *F21S 43/26231* (2024.05);
(Continued)

(58) Field of Classification Search
CPC ... B60Q 1/34; F21S 43/2653; F21S 43/26411; F21S 45/48; F21W 2103/20; F21W 2103/50
See application file for complete search history.

(56) References Cited

U.S. PATENT DOCUMENTS

2019/0322209 A1 10/2019 Sugiyama et al.
2021/0388964 A1* 12/2021 Schadenhofer ......... F21S 43/14
(Continued)

FOREIGN PATENT DOCUMENTS

DE 102014207419 A1 11/2015
JP 2020-17488 A 1/2020
(Continued)

OTHER PUBLICATIONS

The extended European search report issued in corresponding EP Patent Application No. 23868225.6, mailed on Dec. 5, 2025 (11 pages).
(Continued)

*Primary Examiner* — Keith G. Delahoussaye
(74) *Attorney, Agent, or Firm* — Osha Bergman Watanabe & Burton LLP

(57) ABSTRACT

A drawing lamp forms a drawing light distribution pattern by emitting emitted light from a light emitting element toward a front of the lamp via a projection lens. A light shielding plate is disposed between the light emitting element and the projection lens. The light shielding plate is configured to shield a part of light traveling from the light emitting element to the projection lens. In the projection lens, a first projection lens portion for long-distance drawing and a second projection lens portion for short-distance drawing are integrally formed in a state where the first projection lens portion and the second projection lens portion are aligned in a required direction intersecting a front-rear direction of the lamp and in a state where lens effective
(Continued)

surfaces of the first projection lens portion and the second projection lens portion are adjacent to each other.

10 Claims, 23 Drawing Sheets

(51) Int. Cl.
*F21S 45/48* (2018.01)
*F21W 103/20* (2018.01)
*F21W 103/60* (2018.01)

(52) U.S. Cl.
CPC .......... *F21S 45/48* (2018.01); *F21W 2103/20* (2018.01); *F21W 2103/60* (2018.01)

(56) References Cited

U.S. PATENT DOCUMENTS

2022/0120406 A1 4/2022 Woo et al.
2022/0221123 A1* 7/2022 Okubo .................. F21S 41/285
2022/0371509 A1 11/2022 Okubo
2025/0003566 A1* 1/2025 Okubo .................... F21S 43/15
2025/0277570 A1* 9/2025 Okubo .............. F21S 43/26231

FOREIGN PATENT DOCUMENTS

WO 2021140932 A1 7/2021
WO 2022/019231 A1 1/2022

OTHER PUBLICATIONS

International Search Report issued in International Application No. PCT/JP2023/034151, mailed on Nov. 21, 2023 (5 pages).
Written Opinion issued in International Application No. PCT/JP2023/034151, mailed on Nov. 21, 2023 (5 pages).

* cited by examiner 10
60
62
22
30
40
50
54
66
32A
32B
32C
32Aa
32Ba
32Ca
34
36
36a
40a, 54a, 66a
40Aa
40Ba
40Ca
52A
52B
52C
52Aa, 52Ab
52Ba, 52Bb
52Ca
50Cb
20A
20B
20C
Axa
Axb, Lb
Axc
La
Lc
Da
Dc
72
74
V
VI
VII
Y
Z 10
60
62
64
66
54
36
74
34
72
22
50
40
30
20A
20B
20C
52A
52B
52C
52Aa
52Ab
52Ba
52Bb
52Ca
52Cb
40Aa
40Ba
40Ca
32A
32B
32C
32Aa
32Ba
32Ca
Fa
Fb
Fc
Axa, La
Axb, Lb
Axc, Lc
Y
X 10
60
64
62
66
Lc
Lb
La
20C
20B
20A
52C
52B
52A
72
22
50
54
40
74
36
30
34
32A
32B
32C
32Aa
32Ba
32Ca
Axa, Axb, Axc
Z
X 10
22
60
62
64
66
66a
20A
20B
20C
20a
72
50
52A
52B
52C
52Aa
52Ba
52Ca
54
54a
40
40a
40Aa
40Ba
40Ca
La
Lb
Lc
30
32A
32B
32C
34
36
36a
74
Axa
Axb
Axc
Z
X
Y Da
62
60
22
20a
20A
52Ab
52Aa
50
40
52A
Fa
40Aa
La
Axa
34
30
32A
32Aa
10
Z
X 10
60
22
20B
20a
52Bb
52Ba
50
40
52B
Fb
40Ba
Axb, Lb
62
34
30
32B
32Ba
Z
X 10
60
62
22
20C
20a
52Cb
Fc
50
52Ca
40
52C
Lc
40Ca
Axc
Dc
34
30
32C
32Ca
Z
X

FIG. 8
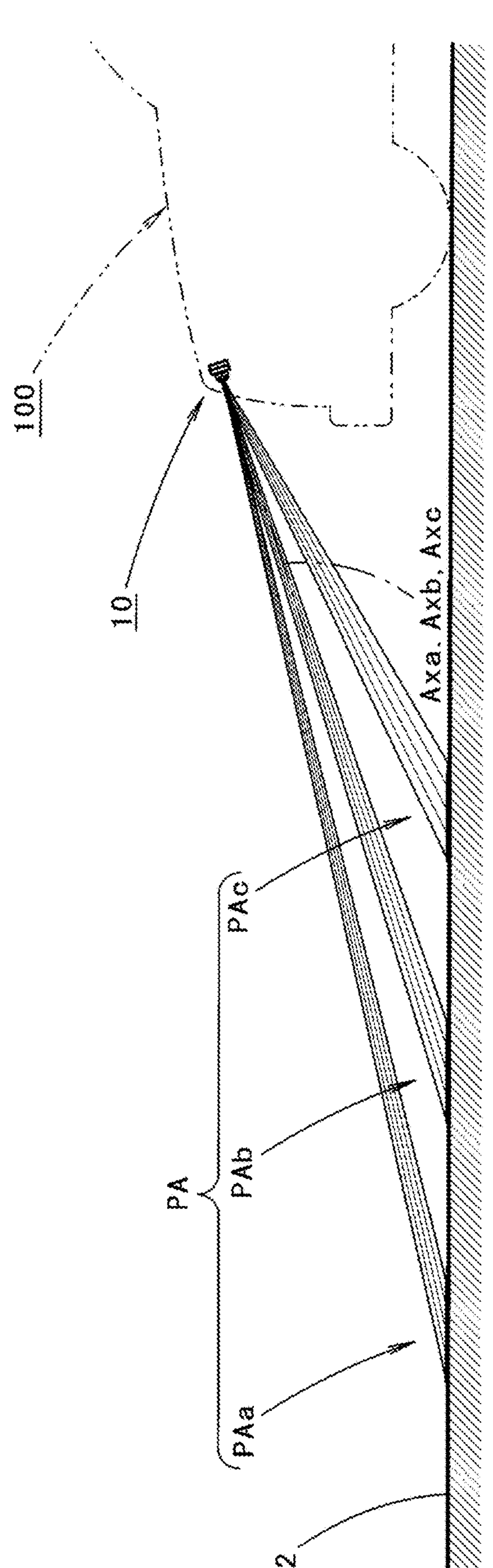

310
360
322
362
330
340
350
366
354
XVI
XVII
332A
332B
352Ba, 352Bb
352Aa, 352Ab
352B
352A
320A
320B
340Aa
340Bb
340Bc
332Aa
332Ba
334
336
336a
340a, 354a, 366a
372
374
Da2
Db2
La2
Lb2
Axa2
Axb2
Z
Y 310
360
364
Lb2
La2
320B
320A
352B
352A
362
372
366
322
350
354
340
374
336
330
334
332A
332B
332Aa
332Ba
Axa2, Axb2
Z
X 310
330
332A
332Aa
334
340
340Aa
350
352A
352Aa
352Ab
360
362
322
320A
320a
Fa2
La2
Axa2
Da2
Z
X 310
330
332B
332Ba
334
340
340Bc
340Bb
350
352B
352Ba
352Bb
320B
320a
322
360
362
Db2
Fb2
Lb2
Axb2
Z
X 410
360
322
350
340
352B
340Bc
Fb2
340Bb
352Ba
352Bb
320B
320a
Lc2
Db2
Axb2
362
330
332B
332Ba
334
Z
X

Lb2
Db2
Axb2
362
360
322
320B
320a
586
584
582
580
340
340Bc
Fb2
340Bb
330
332B
510
Z
X

Lb2
Axb2
362
360
322
320B
320a
352Bb
350
352B
352Ba
Fb2
640Bc
640Bb
640
630
632B
610
Z
X

FIG. 23

400
610
610
Y
X
302
PB2
PBc2
PBb2
PBa2

LAMP FOR DRAWING

TECHNICAL FIELD

The present disclosure relates to a drawing lamp configured to form a drawing light distribution pattern.

BACKGROUND ART

In the related art, as a drawing lamp for forming a drawing light distribution pattern for drawing characters, symbols, and the like on a road surface or the like in the front of the lamp, a drawing lamp that emits the emitted light from a light emitting element toward the front of the lamp via a projection lens is known.

Patent Literature 1 discloses a drawing lamp that is integrally formed with a first projection lens portion for long-distance drawing and a second projection lens portion for short-distance drawing aligned in a required direction (for example, a vehicle width direction) intersecting a front-rear direction of the lamp, as a configuration of a projection lens in an in-vehicle drawing lamp.

In addition, Patent Literature 1 discloses a drawing lamp in which the first projection lens portion for long-distance drawing, the second projection lens portion for short-distance drawing, and a third projection lens portion for close-distance drawing are disposed in a state of being aligned in a required direction (for example, the vehicle width direction) intersecting the front-rear direction of the lamp.

In the drawing lamp disclosed in Patent Literature 1, a light shielding plate for shielding a part of light traveling from a first light emitting element to a third light emitting element to a first projection lens to a third projection lens is disposed between the first projection lens to third projection lens and the first light emitting element to third light emitting element disposed on a rear side of the lamp. Accordingly, the drawing lamp forms three drawing light distribution patterns for long-distance drawing, short-distance drawing, and close-distance drawing as the drawing light distribution pattern.

CITATION LIST

Patent Literature

Patent Literature 1: WO2022/019231A1

SUMMARY OF INVENTION

Technical Problem

By forming the drawing light distribution pattern by the irradiation light from the in-vehicle drawing lamp, it is possible to express the intention of a subject vehicle to the surroundings when the vehicle is traveling at night. Accordingly, it is possible to call attention to other vehicles, pedestrians, and the like.

However, in the projection lens of the drawing lamp described in Patent Literature 1, since the first projection lens portion and the second projection lens portion are disposed apart from each other, the size of the lamp increases.

A first object of the present disclosure is to provide a drawing lamp configured to form a drawing light distribution pattern and capable of forming the drawing light distribution pattern without increasing the size of the lamp.

Further, as in the drawing lamp described in Patent Literature 1, three drawing light distribution patterns for long-distance drawing, short-distance drawing, and close-distance drawing are formed, so that it is possible to enhance a reminder function to the surroundings.

However, since three projection lens portions are disposed to form three drawing light distribution patterns, it is not easy to secure an arrangement space.

A second object of the present disclosure is to provide a drawing lamp configured to form a drawing light distribution pattern and capable of forming a drawing light distribution pattern excellent in a reminder function to the surroundings while having a configuration capable of easily securing an arrangement space for a projection lens.

Solution to Problem

A drawing lamp according to a first aspect of the present disclosure is a drawing lamp configured to form a drawing light distribution pattern by emitting emitted light from a light emitting element toward a front of the lamp via a projection lens, in which

- a light shielding plate configured to shield a part of light traveling from the light emitting element to the projection lens is disposed between the light emitting element and the projection lens,
- the projection lens is integrally formed in a state where a first projection lens portion for long-distance drawing and a second projection lens portion for short-distance drawing are aligned in a required direction intersecting a front-rear direction of the lamp and lens effective surfaces are adjacent to each other,
- a first opening and a second opening are formed in portions of the light shielding plate on a rear side of the lamp of the first projection lens portion and the second projection lens portion, and
- the light emitting element includes a first light emitting element and a second light emitting element that are disposed on the rear side of the lamp of the first opening and the second opening.

A drawing lamp according to a second aspect of the present disclosure is a drawing lamp configured to form a drawing light distribution pattern by emitting emitted light from a light emitting element toward a front of the lamp via a projection lens, in which

- a light shielding plate configured to shield a part of light traveling from the light emitting element to the projection lens is disposed between the light emitting element and the projection lens,
- the projection lens is disposed in a state where a first projection lens portion for long-distance drawing and a second projection lens portion for short-distance drawing are aligned in a required direction intersecting the front-rear direction of the lamp,
- a plurality of openings are formed in the light shielding plate,
- the light shielding plate includes, as the plurality of openings, a first opening disposed on a rear side of the lamp of the first projection lens portion and a plurality of second openings disposed on a rear side of the lamp of the second projection lens portion, and
- the light emitting element includes a first light emitting element disposed on a rear side of the lamp of the first opening and a second light emitting element disposed on the rear side of the lamp of the plurality of second openings.

Advantageous Effects of Invention

The drawing lamp according to the first aspect of the present disclosure has a configuration in which a drawing light distribution pattern is formed by emitting emitted light from a light emitting element toward the front of the lamp via a projection lens, and the projection lens has a configuration in which a first projection lens portion for long-distance drawing and a second projection lens portion for short-distance drawing are disposed in a state of being aligned in a required direction intersecting a front-rear direction of the lamp. In addition, on a light shielding plate disposed between the light emitting element and the projection lens, a first opening and a second opening are formed in portions on a rear side of the lamp of a first projection lens portion and a second projection lens portion, and the first light emitting element and the second light emitting element are disposed on a rear side of the lamp of the first opening and the second opening, so that the drawing light distribution pattern can be formed at two places of far and near.

In this case, the first projection lens portion and the second projection lens portion are integrally formed with lens effective surfaces thereof adjacent to each other. Therefore, the drawing light distribution pattern can be formed without increasing a size of the lamp.

As described above, according to the drawing lamp according to the first aspect of the present disclosure, the drawing light distribution pattern can be formed without increasing the size of the drawing lamp configured to form the drawing light distribution pattern.

In addition, in the drawing lamp according to the first aspect of the present disclosure, since the first projection lens portion and the second projection lens portion are integrally formed with the lens effective surfaces thereof adjacent to each other, the projection lens can be viewed as one collective lens, and the design properties of the first projection lens portion and the second projection lens portion can be improved.

The drawing lamp according to the second aspect of the present disclosure is configured to form a drawing light distribution pattern by emitting the emitted light from the light emitting element toward the front of the lamp via the projection lens. The projection lens is disposed in a state where the first projection lens portion for long-distance drawing and the second projection lens portion for short-distance drawing are aligned in a required direction intersecting the front-rear direction of the lamp. In the light shielding plate disposed between the light emitting element and the projection lens, a first opening is formed on a rear side of the lamp of the first projection lens portion, and a plurality of second openings are formed on a rear side of the lamp of the second projection lens portion. Further, the first light emitting element is disposed on the rear side of the lamp of the first opening, and the second light emitting element is disposed on the rear side of the lamp of the plurality of second openings.

A drawing light distribution pattern can be formed in a long-distance region as a reverse projection image of the first opening formed in the light shielding plate by the emitted light from the first light emitting element and incident on the first projection lens portion. In addition, a plurality of drawing light distribution patterns can be formed in a short-distance region as reverse projection images of the plurality of second openings formed in the light shielding plate by the emitted light from the second light emitting element and incident on the second projection lens portion.

In order to clearly form the drawing light distribution pattern formed in the long-distance region, it is necessary to form a clear reverse projection image by the first opening. In order to clearly form the drawing light distribution pattern formed in the short-distance region, it is not necessary to form a very clear reverse projection image by the second opening.

Therefore, by adopting a configuration in which the plurality of drawing light distribution patterns are formed in the short-distance region by the emitted light from the second light emitting element and incident on the second projection lens portion through the plurality of second openings formed in the light shielding plate, it is possible to easily secure the arrangement space of the projection lens. Therefore, three or more drawing light distribution patterns are formed with required sharpness. Accordingly, the reminder function to the surroundings can be enhanced.

According to the drawing lamp according to the second aspect of the present disclosure, in the drawing lamp configured to form the drawing light distribution pattern, it is possible to form the drawing light distribution pattern having an excellent reminder function to the surroundings while easily securing the arrangement space of the projection lens.

BRIEF DESCRIPTION OF DRAWINGS

FIG. 8 is a side view illustrating a state where the drawing lamps are mounted on a vehicle.

FIG. 23 is a plan view illustrating a state where drawing lamps according to a third modification of the second embodiment are mounted on the vehicle.

DESCRIPTION OF EMBODIMENTS

Hereinafter, embodiments of the present disclosure will be described with reference to the drawings.

First Embodiment

Figure 1:
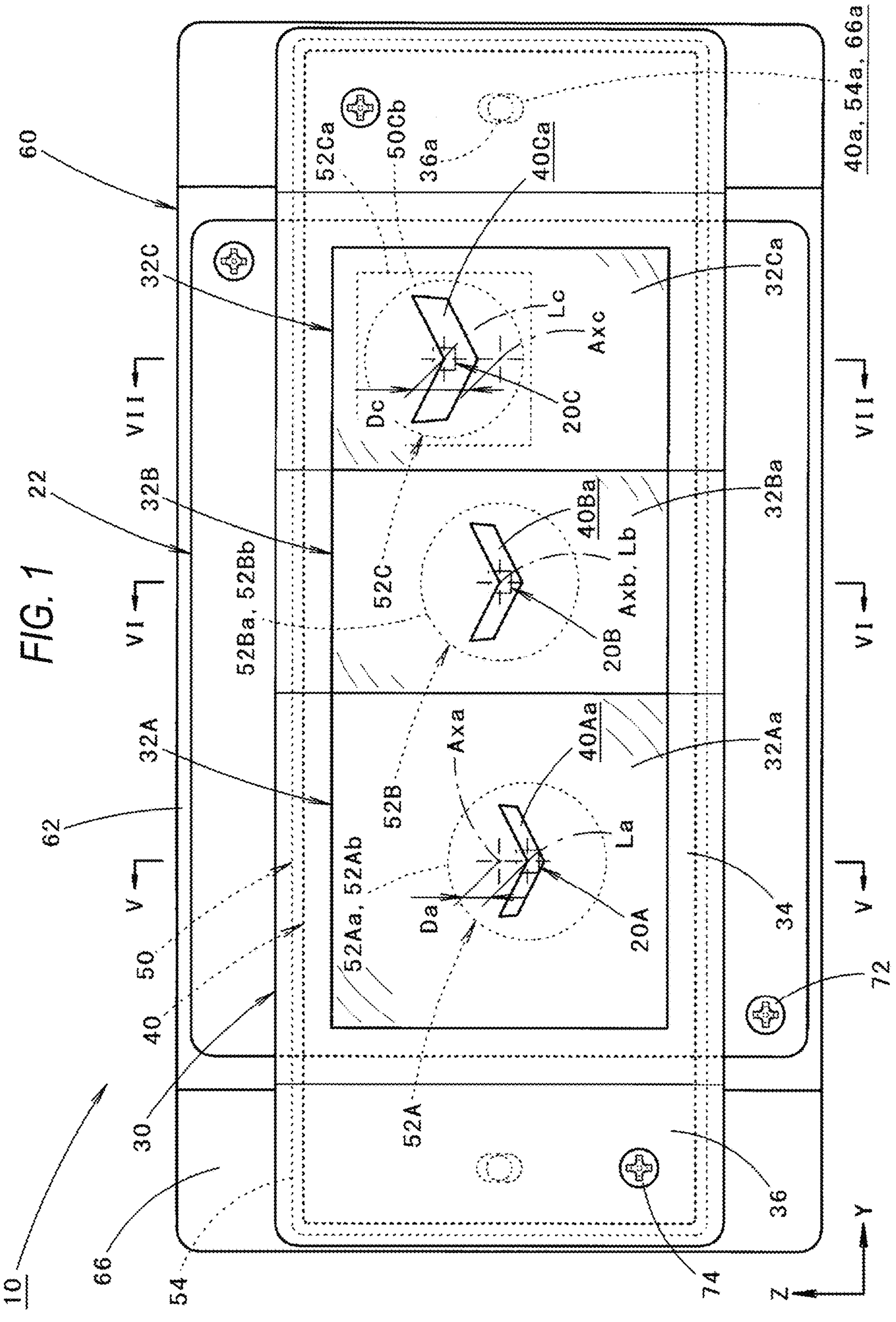
FIG. 1 is a front view illustrating a drawing lamp according to a first embodiment of the present disclosure.
Figure 2:
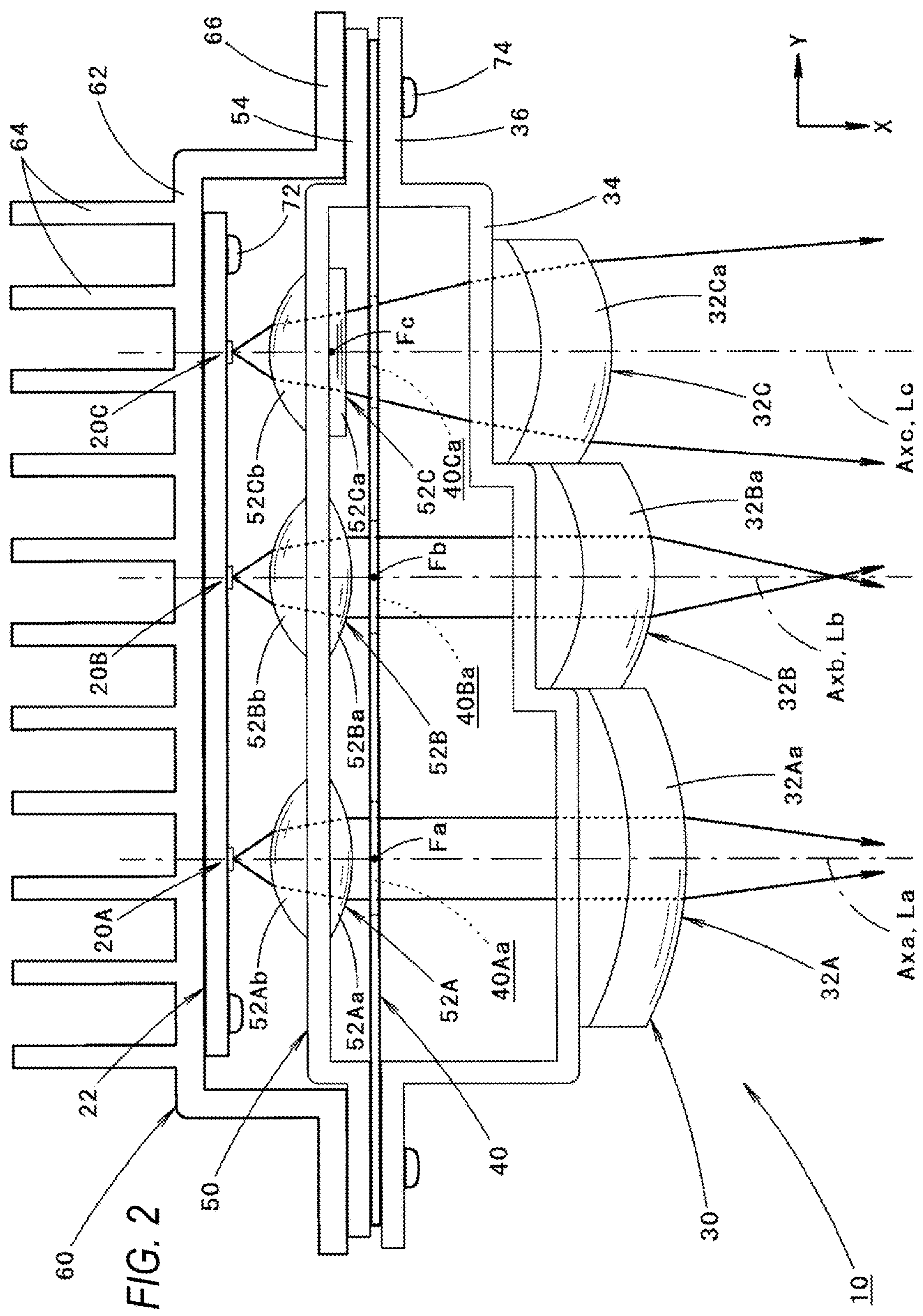
FIG. 2 is a plan view illustrating the drawing lamp according to the first embodiment.
Figure 3:
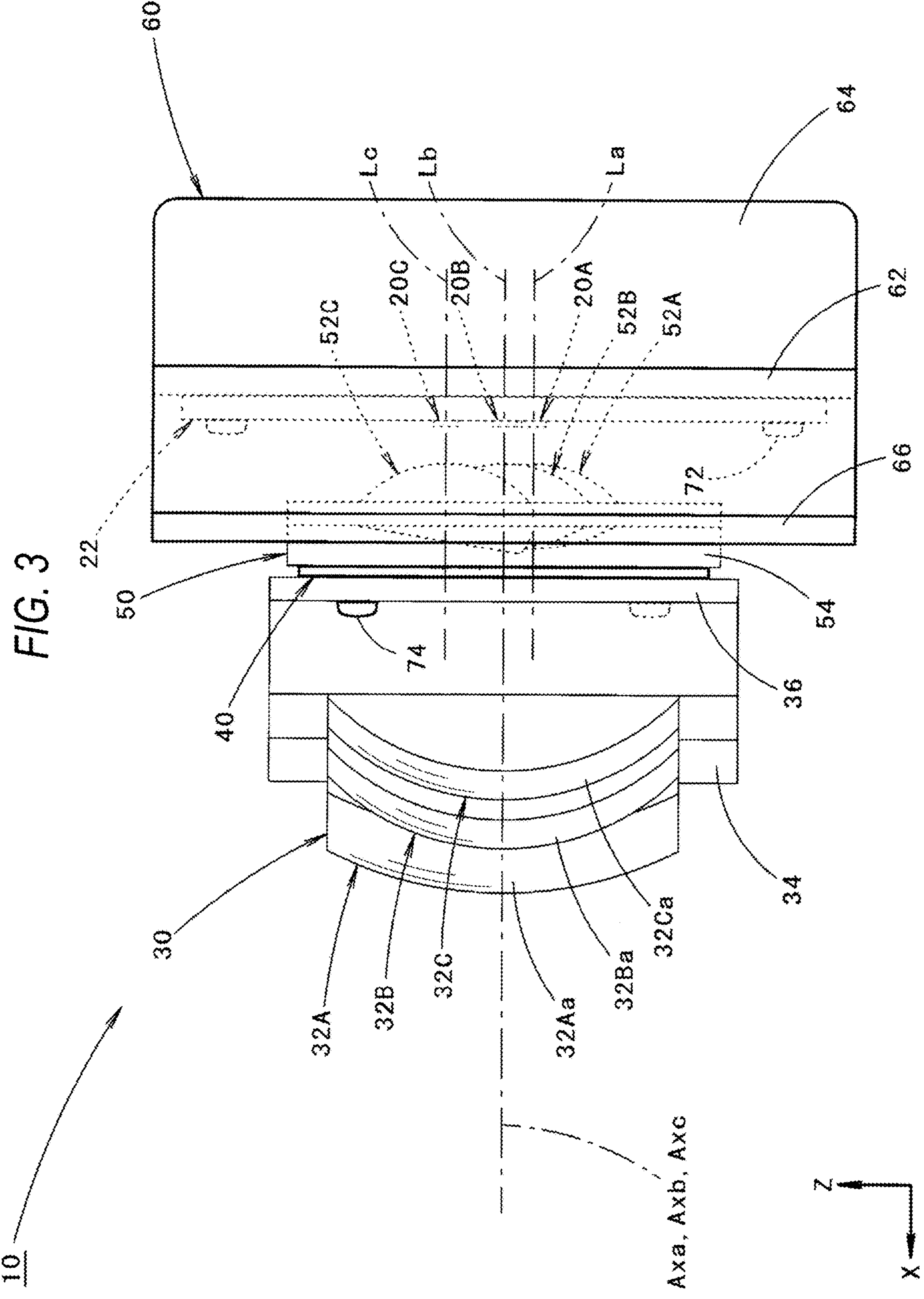
FIG. 3 is a side view illustrating the drawing lamp according to the first embodiment.
Figure 4:
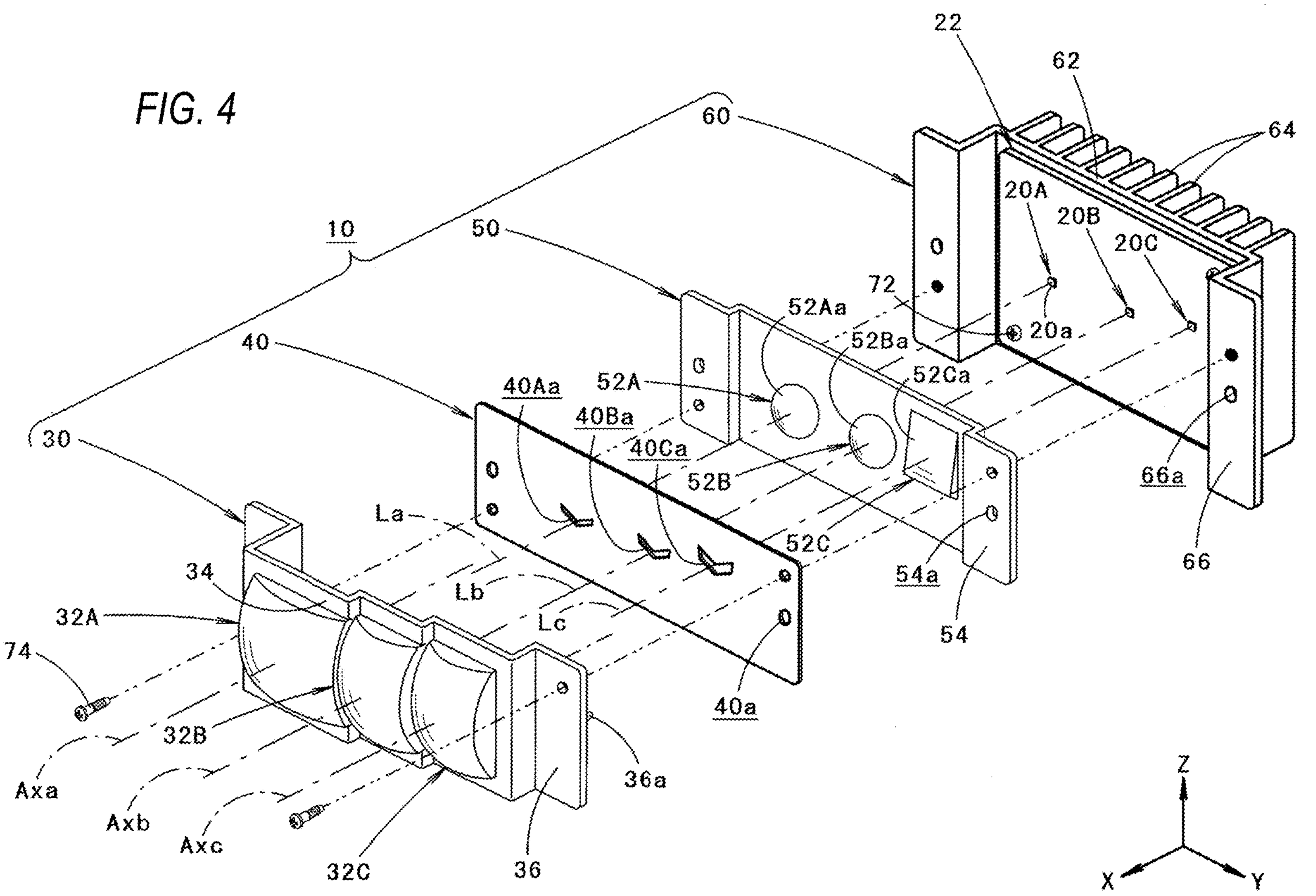
FIG. 4 is an exploded perspective view illustrating main components of the drawing lamp according to the first embodiment.

FIG. 1 is a front view illustrating a drawing lamp 10 according to a first embodiment of the present disclosure. FIG. 2 is a plan view illustrating the drawing lamp 10 according to the first embodiment. FIG. 3 is a side view illustrating the drawing lamp 10 according to the first embodiment. FIG. 4 is an exploded perspective view illustrating main components of the drawing lamp 10 according to the first embodiment.

In FIGS. 1 to 4, a direction indicated by X is "the front of the lamp", a direction indicated by Y is a "left direction" (a "right direction" in a front view of the lamp) orthogonal to "the front of the lamp", and a direction indicated by Z is an "upward direction". The same applies to drawings other than FIGS. 1 to 4.

Before describing a specific configuration of the drawing lamp 10 according to the present embodiment, an outline thereof will be described.

Figure 9:
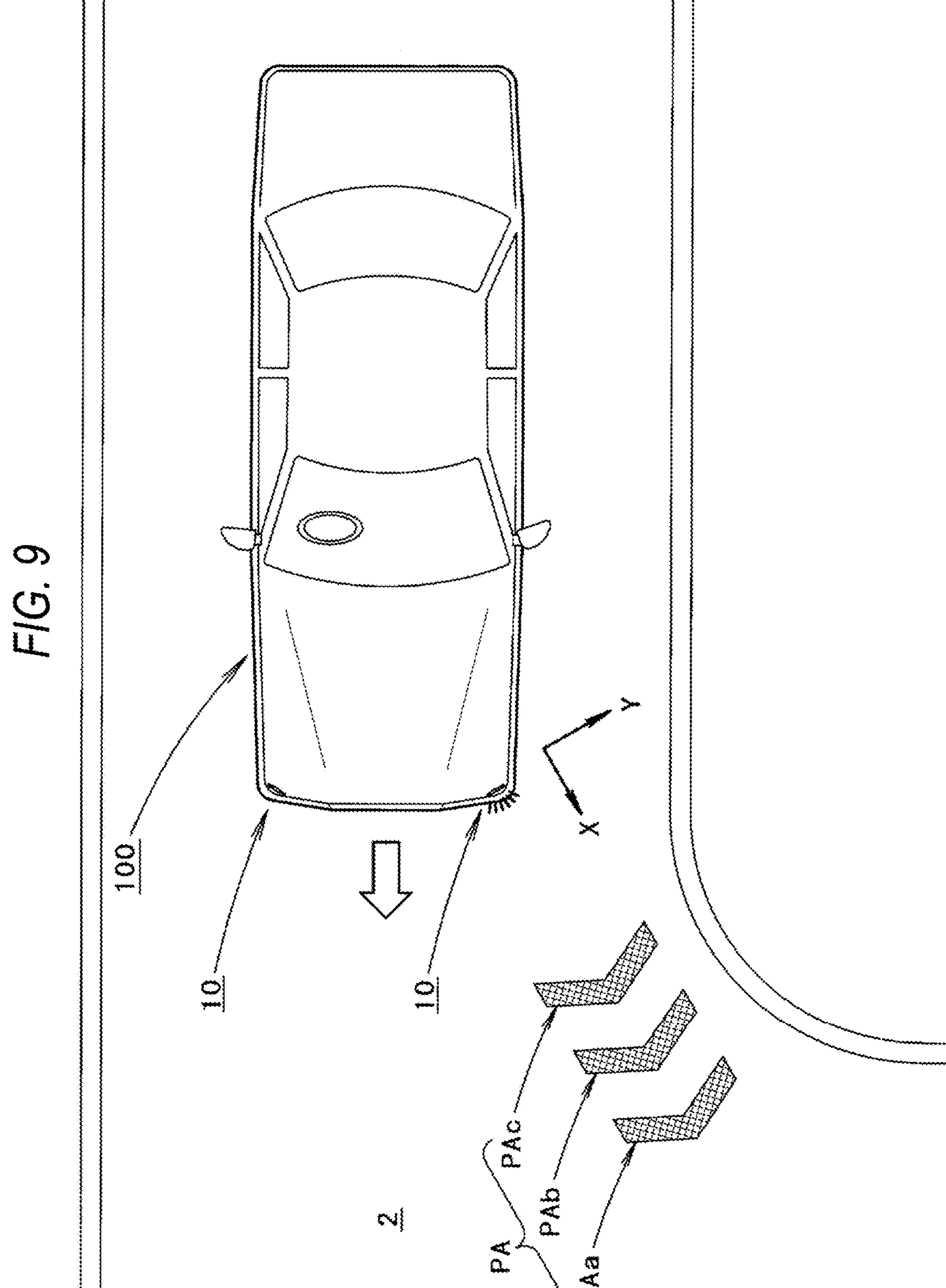
FIG. 9 is a plan view illustrating a state where the drawing lamps are mounted on the vehicle.

FIG. 8 is a side view illustrating a state where the drawing lamps 10 are mounted on a vehicle 100. FIG. 9 is a plan view illustrating a state where the drawing lamps 10 are mounted on the vehicle 100. FIG. 9 illustrates a state where the left drawing lamp 10 is turned on.

As illustrated in FIGS. 8 and 9, the drawing lamp 10 is configured to emit light obliquely downward toward the outside in a vehicle width direction in a state of being mounted on a side end in the vehicle width direction at a front end of the vehicle 100. The drawing lamp 10 is turned on in synchronization with turning on of a front turn signal lamp (not illustrated). Accordingly, a drawing light distribution pattern PA is formed on a road surface 2 in front of the vehicle.

As illustrated in FIGS. 8 and 9, in a state where the drawing lamp 10 is mounted on the vehicle 100, a front surface of the lamp is provided to face a direction inclined obliquely downward with respect to a front-rear direction of the vehicle. However, as illustrated in FIGS. 1 to 4, when the drawing lamp 10 is formed as a single piece, the front surface of the lamp faces a horizontal direction.

Next, a specific configuration of the drawing lamp 10 will be described.

Figure 5:
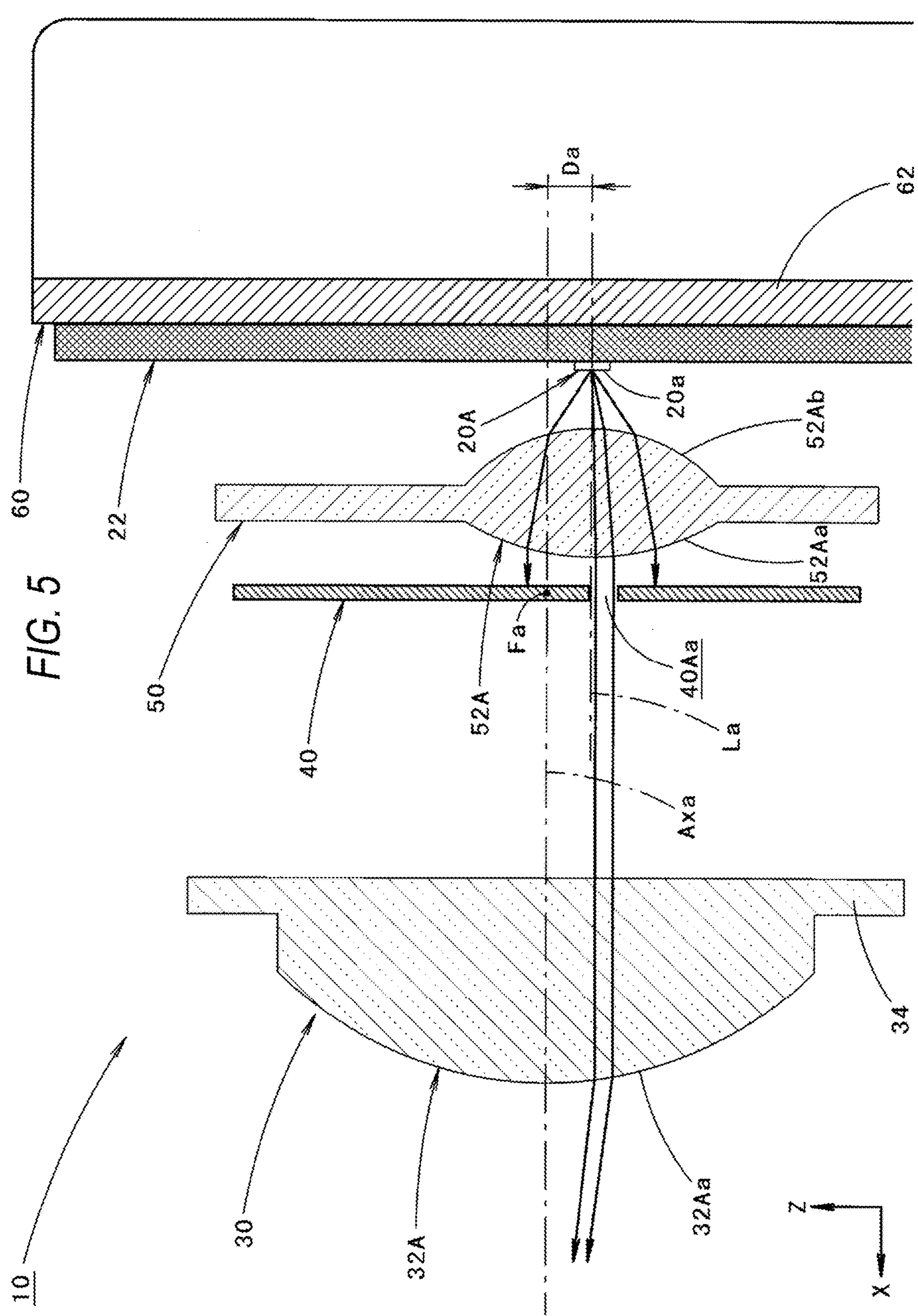
FIG. 5 is a cross-sectional view taken along a line V-V in FIG. 1.
Figure 6:
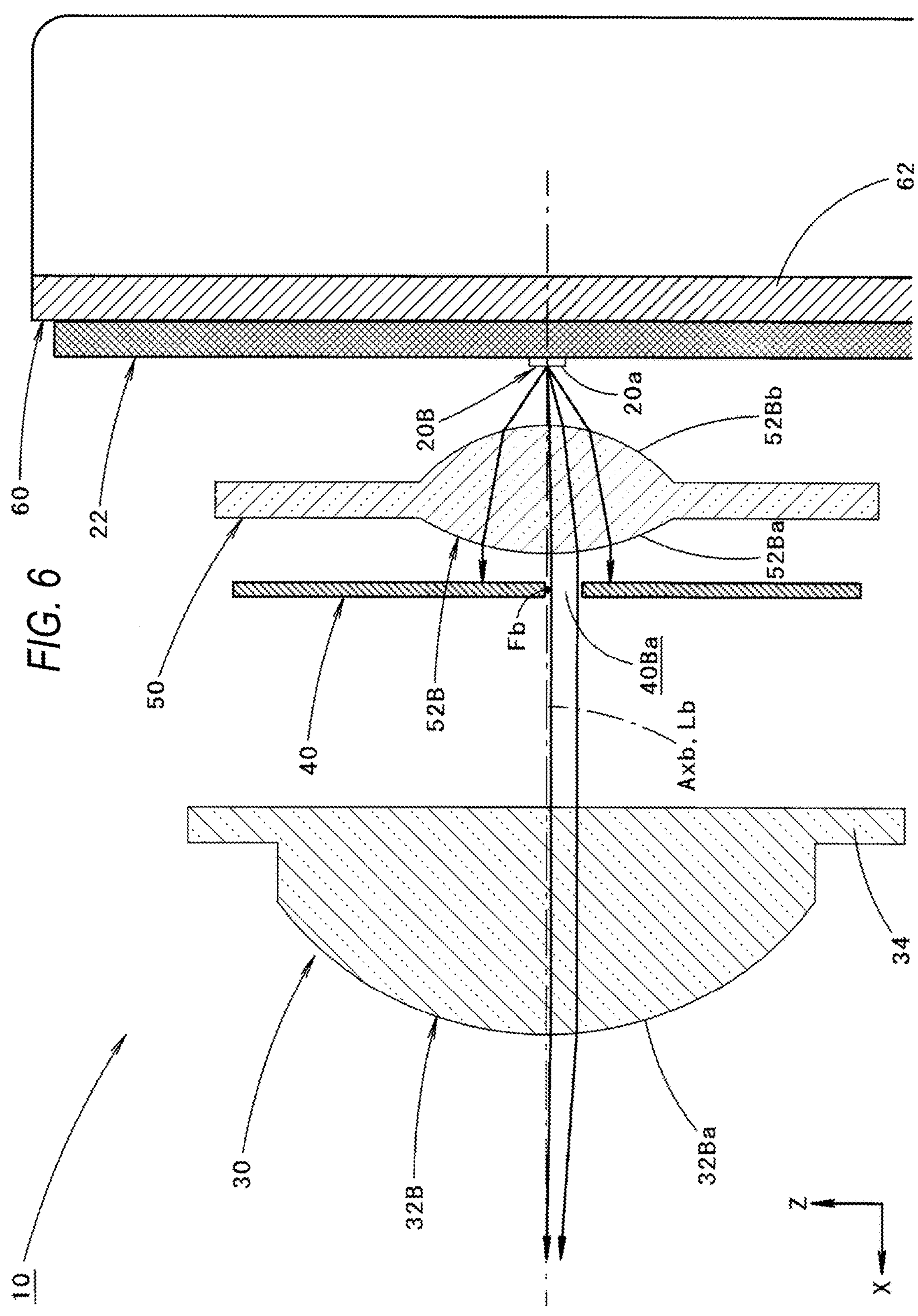
FIG. 6 is a cross-sectional view taken along a line VI-VI in FIG. 1.
Figure 7:
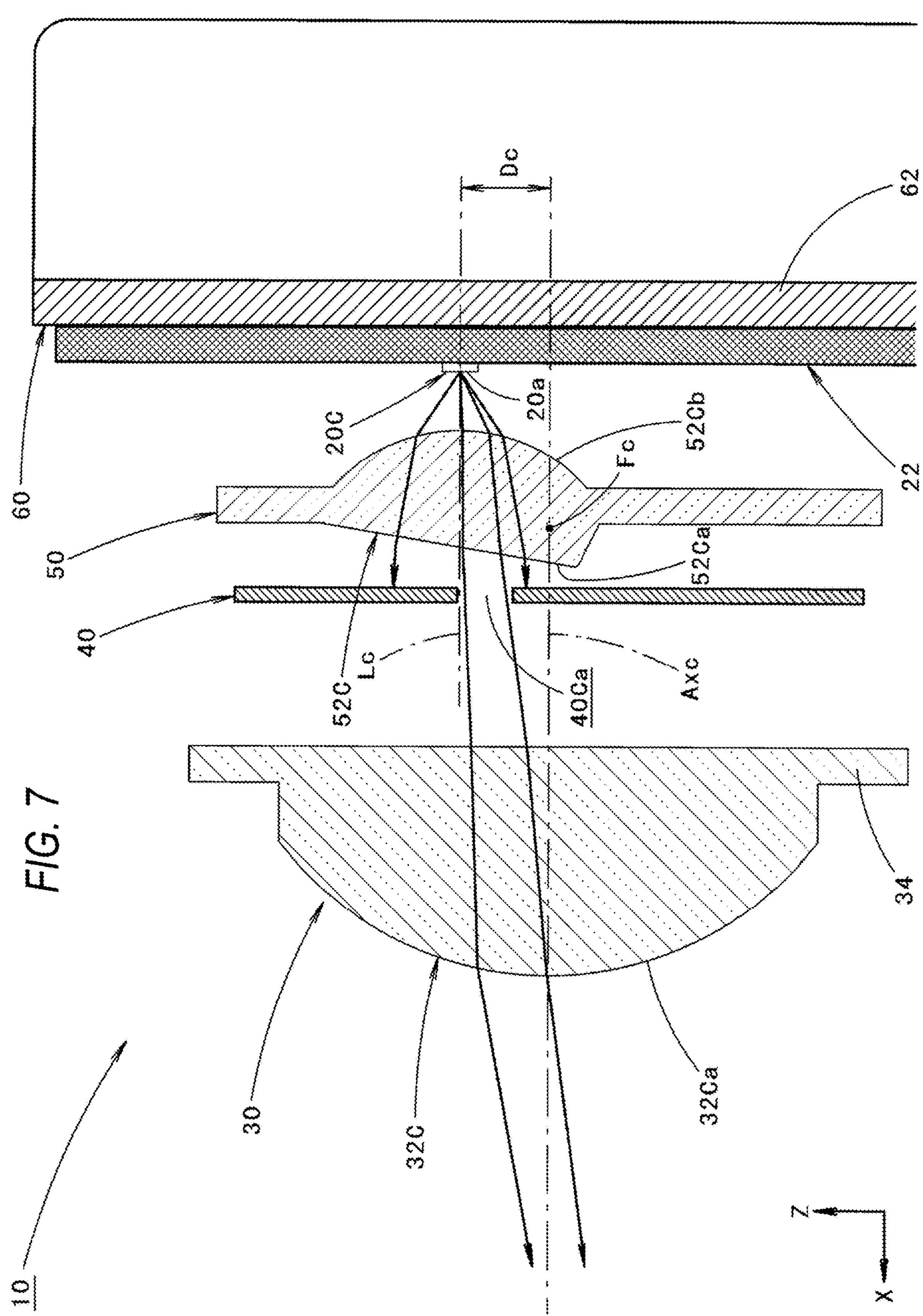
FIG. 7 is a cross-sectional view taken along a line VII-VII in FIG. 1.

FIG. 5 is a cross-sectional view taken along a line V-V in FIG. 1. FIG. 6 is a cross-sectional view taken along a line VI-VI in FIG. 1. FIG. 7 is a cross-sectional view taken along a line VII-VII in FIG. 1.

As illustrated in FIG. 5 to 7, the drawing lamp 10 is configured to emit emitted light from a light emitting element toward the front of the lamp via a projection lens 30. The drawing lamp 10 includes three light emitting elements of a first light emitting element 20A, a second light emitting element 20B, and a third light emitting element 20C.

In the projection lens 30, three projection lens portions of a first projection lens portion 32A, a second projection lens portion 32B, and a third projection lens portion 32C are integrally formed in a state where the three projection lens portions of a first projection lens portion 32A, a second projection lens portion 32B, and a third projection lens portion 32C are aligned in a left-right direction. At this time, the first projection lens portion 32A, the second projection lens portion 32B, and the third projection lens portion 32C are formed such that respective optical axes Axa, Axb, and Axc extend in the front-rear direction of the lamp at the same height position.

The first projection lens portion 32A located on a right side (left side in a front view of the lamp) is a projection lens portion for long-distance drawing. The second projection lens portion 32B located at the center is a projection lens portion for short-distance drawing. The third projection lens portion 32C located on a left side is a projection lens portion for close-distance drawing.

The first projection lens portion 32A, the second projection lens portion 32B, and the third projection lens portion 32C are plano-convex lenses in which respective front surfaces 32Aa, 32Ba, and 32Ca are implemented by convex curved surfaces, and each have a rectangular outer shape in the front view of the lamp. The first projection lens portion 32A to the third projection lens portion 32C are integrally formed with lens effective surfaces thereof, which is the front surfaces 32Aa to 32Ca achieving the lens function, adjacent to each other.

Specifically, the first projection lens portion 32A to the third projection lens portion 32C have the same up-down width, and a left-right width of the first projection lens portion 32A is larger than those of the second projection lens portion 32B and the third projection lens portion 32C.

That is, the first projection lens portion 32A is formed to have a substantially square outer shape in the front view of the lamp, and each of the second projection lens portion 32B and the third projection lens portion 32C is formed to have a vertically long rectangular outer shape in the front view of the lamp.

The first projection lens portion 32A to the third projection lens portion 32C are disposed in this order in a state of being displaced in a stepped manner toward the rear side of the lamp. The first projection lens portion 32A and the second projection lens portion 32B are provided such that respective rear foci Fa and Fb of the first projection lens portion 32A and the second projection lens portion 32B are at the same position in the front-rear direction of the lamp. However, the third projection lens portion 32C is provided such that a rear focus Fc of the third projection lens portion 32C is located on a rear side of the lamp of the rear foci Fa and Fb. That is, a focal length of the first projection lens portion 32A, which has a size larger than the second projection lens portion 32B, is larger than a focal length of the second projection lens portion 32B. A focal length of the third projection lens portion 32C is substantially the same as the focal length of the second projection lens portion 32B.

The first projection lens portion 32A to the third projection lens portion 32C are surrounded by an outer peripheral flange portion 34 formed to extend in a stepwise manner along respective rear surface of the first projection lens portion 32A to the third projection lens portion 32C. A pair of mounting flange portions 36 are formed on both left and right sides of the outer peripheral flange portion 34. The pair of left and right mounting flange portions 36 have L-shaped horizontal cross-sectional shapes having different lengths in the front-rear direction of the lamp. Rear end surfaces of the pair of left and right mounting flange portions 36 are formed to be located on the same plane orthogonal to the front-rear direction of the lamp.

The first light emitting element 20A to the third light emitting element 20C are all white light emitting diodes and each have a rectangular (specifically, square) light emitting surface 20*a*.

The first light emitting element 20A to the third light emitting element 20C are mounted on a common substrate 22 in a state of being disposed on a rear side of the lamp of the first projection lens portion 32A to the third projection lens portion 32C, respectively. The substrate 22 is supported by a heat sink 60 in a state of extending along a plane orthogonal to the front-rear direction of the lamp.

A light shielding plate 40 for shielding a part of light traveling from the first light emitting element 20A to the third light emitting element 20C toward the first projection lens portion 32A to the third projection lens portion 32C is disposed between the first light emitting element 20A to the third light emitting element 20C and the first projection lens portion 32A to the third projection lens portion 32C. The light shielding plate 40 is implemented by a thin plate extending along a plane orthogonal to the front-rear direction of the lamp.

The light shielding plate 40 is positioned in a state of being in contact with the pair of left and right mounting flange portions 36 of the projection lens 30 from the rear side of the lamp at both left and right ends of the light shielding plate 40. Accordingly, the light shielding plate 40 is disposed along a vertical surface including the rear foci Fa and Fb of the first projection lens portion 32A and the second projection lens portion 32B.

A first opening 40Aa, a second opening 40Ba, and a third opening 40Ca are formed in portions of the light shielding plate 40 on the rear side of the lamp of the first projection lens portion 32A, the second projection lens portion 32B, and the third projection lens portion 32C.

The first opening 40Aa to the third opening 40Ca each have a V-shaped opening shape in the front view of the lamp. An opening angle of the V-shape is set to a value of about 90° to 150° (for example, a value of about 120°).

In the first opening 40Aa to the third opening 40Ca, the second opening 40Ba is located on an upper side of the first opening 40Aa. The third opening 40Ca is located on an upper side of the second opening 40Ba.

Specifically, the first opening 40Aa is formed such that a central lower end of an upper inner peripheral edge thereof is located on a lower side of the optical axis Axa of the first projection lens portion 32A. The second opening 40Ba is formed such that a central lower end of an upper inner peripheral edge thereof is located on the optical axis Axb of the second projection lens portion 32B. The third opening 40Ca is formed such that a central lower end of an upper inner peripheral edge thereof is formed to be located on an upper side of the optical axis Axc of the third projection lens portion 32C. At this time, an upper displacement amount Dc of the central lower end of the upper inner peripheral edge of the third opening 40Ca from the optical axis Axc is larger than a lower displacement amount Da of the central lower end of the upper inner peripheral edge of the first opening 40Aa from the optical axis Axa. For example, the upper displacement amount Dc of the central lower end of the upper inner peripheral edge of the third opening 40Ca from the optical axis Axc may be about twice the lower displacement amount Da of the central lower end of the upper inner peripheral edge of the first opening 40Aa from the optical axis Axa.

In the first opening 40Aa to the third opening 40Ca, the second opening 40Ba is formed to have a larger up-down width than the first opening 40Aa. Further, the third opening 40Ca is formed to have a larger up-down width than the second opening 40Ba.

Further, inner peripheral edges on both left and right sides of the first opening 40Aa to the third opening 40Ca all extend upward in a direction slightly expanding with respect to a vertical direction. The second opening 40Ba has a left-right width slightly larger than that of the first opening 40Aa. In addition, the third opening 40Ca has a left-right width slightly larger than that of the second opening 40Ba.

The first light emitting element 20A is disposed on a lower side of the optical axis Axa of the first projection lens portion 32A. The second light emitting element 20B is disposed on the optical axis Axb of the second projection lens portion 32B. The third light emitting element 20C is disposed on an upper side of the optical axis Axc of the third projection lens portion 32C.

Specifically, the first light emitting element 20A, the second light emitting element 20B, and the third light emitting element 20C are located on a first reference axis line La, a second reference axis line Lb, and a third reference axis line Lc. The first reference axis line La, the second reference axis line Lb, and the third reference axis line Lc extend in the front-rear direction of the lamp such that light emitting centers of the first light emitting element 20A, the second light emitting element 20B, and the third light emitting element 20C pass through lower ends of central portions of upper inner peripheral edges of the first opening 40Aa, the second opening 40Ba, and the third opening 40Ca of the light shielding plate 40, respectively.

The first light emitting element 20A to the third light emitting element 20C are connected to an electronic control unit (not illustrated), and are turned on and off by the electronic control unit according to a vehicle travel state or the like.

A condenser lens assembly 50 is disposed between the substrate 22 and the light shielding plate 40.

In the condenser lens assembly 50, three condenser lenses of a first condenser lens 52A, a second condenser lens 52B, and a third condenser lens 52C is integrally formed via plate-shaped portions in a state where the three condenser lenses of a first condenser lens 52A, a second condenser lens 52B, and a third condenser lens 52C are aligned in the left-right direction. At this time, the first condenser lens 52A, the second condenser lens 52B, and the third condenser lens 52C are located on the first reference axis line La, the second reference axis line Lb, and the third reference axis line Lc, respectively.

The first condenser lens 52A and the second condenser lens 52B respectively have rear surfaces 52Ab and 52Bb formed in a convex curved surface shape, and front surfaces 52Aa and 52Ba formed in a convex curved surface shape having a smaller curvature than the rear surfaces 52Ab and 52Bb. On the other hand, the third condenser lens 52C also has a rear surface 52Cb formed in a convex curved surface shape, and a front surface 52Ca formed in a plane shape. The plane constituting the front surface 52Ca has a wedge-shaped vertical cross-sectional shape including a portion protruding forward of the lamp from an upper end edge toward a lower end edge.

Accordingly, emitted light from the first light emitting element 20A and the second light emitting element 20B corresponding to the first condenser lens 52A and the second condenser lens 52B, respectively, is incident on the first opening 40Aa and the second opening 40Ba of the light shielding plate 40 as light parallel to the first reference axis line La and the second reference axis line Lb. The emitted light from the third light emitting element 20C corresponding to the third condenser lens 52C is incident on the third opening 40Ca of the light shielding plate 40 as light that is obliquely downward with respect to the third reference axis line Lc and is diffused in the left-right direction.

The condenser lens assembly 50 has a configuration in which a pair of mounting flange portions 54 are formed on both left and right sides of a plate-shaped portion located around the first condenser lens 52A to the third condenser lens 52C. The pair of left and right mounting flange portions 54 have an L-shaped horizontal cross-sectional shape, and front end surfaces thereof come into contact with both left and right ends of the light shielding plate 40 from the rear side of the lamp, so that the first condenser lens 52A to the third condenser lens 52C are positioned on the first reference axis line La to the third reference axis line Lc.

The heat sink 60 includes a body portion 62 extending along a plane orthogonal to the front-rear direction of the lamp, a plurality of heat-dissipating fins 64 extending from the body portion 62 toward the rear of the lamp along a vertical surface, and a pair of mounting flange portions 66 formed on both left and right side portions of the body portion 62.

The substrate 22 is positioned and supported by fastening screws 72 at two locations on a diagonal line of the substrate 22 in a state of being in surface contact with the body portion 62 of the heat sink 60.

The projection lens 30, the light shielding plate 40, and the condenser lens assembly 50 are positioned and supported on the pair of left and right mounting flange portions 66 of the heat sink 60 by fastening screws 74 at two locations on a diagonal line thereof. The pair of left and right mounting flange portions 36 of the projection lens 30, the both left and right ends of the light shielding plate 40, and the pair of left and right mounting flange portions 54 of the condenser lens assembly 50 are screwed together in a state of being overlapped on the pair of left and right mounting flange portions 66 of the heat sink 60. The pair of left and right mounting flange portions 36 of the projection lens 30 are each provided with a positioning pin 36*a*. On the other hand, pin insertion holes 40*a*, 54*a*, and 66*a* into which the positioning pins 36*a* are inserted are respectively formed in the both left and right ends of the light shielding plate 40, the pair of left and right mounting flange portions 54 of the condenser lens assembly 50, and the pair of left and right mounting flange portions 66 of the heat sink 60.

Next, the drawing light distribution pattern PA illustrated in FIGS. 8 and 9 will be described.

As described above, the drawing light distribution pattern PA is formed by the irradiation light from the drawing lamp 10. The drawing light distribution pattern PA includes three drawing light distribution patterns PAa, PAb, and PAc as illustrated in FIGS. 8 and 9.

The three drawing light distribution patterns PAa, PAb, and PAc are all light distribution patterns having an inverted V shape, which is a shape pointed toward the front of the lamp, and are formed in substantially the same size and in series arrangement at substantially equal intervals.

The drawing light distribution pattern PAa formed in a long-distance region of the road surface 2 in front of the vehicle is a light distribution pattern to be formed by the emitted light from the first light emitting element 20A toward the front of the lamp through the first projection lens portion 32A.

The drawing light distribution pattern PAa is formed as a reverse projection image of the first opening 40Aa having a V-shaped opening shape formed in the light shielding plate 40.

The first opening 40Aa is formed such that the lower end of the central portion of the upper inner peripheral edge of the first opening 40Aa is located on the lower side of the optical axis Axa of the first projection lens portion 32A. Therefore, the light passing through the first opening 40Aa is emitted toward the front of the lamp, as light upward from the optical axis Axa. Accordingly, the drawing light distribution pattern PAa is formed in the long-distance region.

The emitted light from the first light emitting element 20A is efficiently incident on the first opening 40Aa by the first condenser lens 52A having a biconvex lens shape. Therefore, the brightness of the drawing light distribution pattern PAa is sufficiently secured. Moreover, the first light emitting element 20A and the first condenser lens 52A are disposed on the first reference axis line La passing through the lower end of the central portion of the upper inner peripheral edge of the first opening 40Aa. Therefore, the brightness of the drawing light distribution pattern PAa is sufficiently secured.

The drawing light distribution pattern PAb formed in a short-distance region of the road surface 2 in front of the vehicle is a light distribution pattern to be formed by the emitted light from the second light emitting element 20B toward the front of the lamp through the second projection lens portion 32B.

The drawing light distribution pattern PAb is formed as a reverse projection image of the second opening 40Ba having a V-shaped opening shape formed in the light shielding plate 40.

At this time, the second opening 40Ba is formed such that the lower end of the central portion of the upper inner peripheral edge of the second opening 40Ba is located on the optical axis Axb of the second projection lens portion 32B. Therefore, the light passing through the second opening 40Ba is emitted toward the front of the lamp as light substantially parallel to the optical axis Axb. Accordingly, the drawing light distribution pattern PAb is formed in the short-distance region.

In addition, the emitted light from the second light emitting element 20B is efficiently incident on the second opening 40Ba by the second condenser lens 52B having a biconvex lens shape. Therefore, the brightness of the drawing light distribution pattern PAb is sufficiently secured. Moreover, the second light emitting element 20B and the second condenser lens 52B are disposed on the second reference axis line Lb passing through the lower end of the central portion of the upper inner peripheral edge of the second opening 40Ba. Therefore, the brightness of the drawing light distribution pattern PAb is sufficiently secured.

The drawing light distribution pattern PAc formed in the close-distance region of the road surface 2 in front of the vehicle is a light distribution pattern to be formed by the emitted light from the third light emitting element 20C toward the front of the lamp through the third projection lens portion 32C.

The drawing light distribution pattern PAc is formed as a reverse projection image of the third opening 40Ca having a V-shaped opening shape formed in the light shielding plate 40. However, since the third opening 40Ca is located on a front side of the lamp with respect to the rear focus Fc of the third projection lens portion 32C, the reverse projection image is slightly unclear.

At this time, since the central lower end of the upper inner peripheral edge of the third opening 40Ca is located on the upper side of the optical axis Axc of the third projection lens portion 32C, the third opening 40Ca is irradiated toward the front of the lamp as light downward from the optical axis Axc of the third projection lens portion 32C. Accordingly, the drawing light distribution pattern PAc is formed in the close-distance region.

The upper displacement amount Dc of the lower end of the central portion of the upper inner peripheral edge of the third opening 40Ca from the optical axis Axc is set to a value larger than the lower displacement amount Da of the lower end of the central portion of the upper inner peripheral edge of the first opening 40Aa from the optical axis Axa. Therefore, although irradiation angles of the emitted light from the first projection lens portion 32A to the third projection lens portion 32C with respect to the road surface 2 in front of the vehicle are different from each other, an interval between the drawing light distribution pattern PAb and the drawing light distribution pattern PAc is substantially the same as an interval between the drawing light distribution pattern PAa and the drawing light distribution pattern PAb.

In addition, the emitted light from the third light emitting element 20C is efficiently incident on the third opening 40Ca by the third condenser lens 52C. Therefore, the brightness of the drawing light distribution pattern PAc is sufficiently secured. Moreover, the third light emitting element 20C and the third condenser lens 52C are disposed on the third reference axis line Lc passing through the lower end of the central portion of the upper inner peripheral edge of the third opening 40Ca. Therefore, the brightness of the drawing light distribution pattern PAc is sufficiently secured. The rear surface 52Cb of the third condenser lens 52C is formed in a convex curved surface shape. The front surface 52Ca of the third condenser lens 52C is formed in a plane shape, and has a wedge-shaped vertical cross-sectional shape including a portion protruding forward of the lamp from an upper end edge toward a lower end edge. Therefore, the emitted light from the third condenser lens 52C is incident on the third opening 40Ca as substantially parallel light that spreads slightly in the left-right direction and that faces downward in an upper-lower direction. Therefore, the emitted light from the third light emitting element 20C is efficiently incident on the third opening 40Ca having a relatively large opening shape.

Up-down widths of the first opening 40Aa to the third opening 40Ca increase in this order. Further, inner peripheral edges on both left and right sides of the first opening 40Aa to the third opening 40Ca all extend upward in a direction slightly expanding with respect to the vertical direction. Further, left-right widths of the first opening 40Aa to the third opening 40Ca slightly increase in this order. Accordingly, the three drawing light distribution patterns PAa to PAc are formed in substantially the same size.

Next, operations of the present embodiment will be described.

The drawing lamp 10 according to the present embodiment forms the drawing light distribution patterns PAa and PAb by emitting the emitted light from the first light emitting element 20A and the second light emitting element 20B toward the front of the lamp via the projection lens 30. The projection lens 30 is disposed in a state where the first projection lens portion 32A for long-distance drawing and the second projection lens portion 32B for short-distance drawing are aligned in the left-right direction (a required direction intersecting the front-rear direction of the lamp). In addition, on the light shielding plate 40 disposed between the first light emitting element 20A and the second light emitting element 20B and the projection lens 30, the first opening 40Aa and the second opening 40Ba are formed in portions on the rear side of the lamp of the first projection lens portion 32A and the second projection lens portion 32B. The first light emitting element 20A and the second light emitting element 20B are disposed on the rear side of the lamp of the first opening 40Aa and the second opening 40Ba. Therefore, the drawing light distribution pattern PAa can be formed in the long-distance region, and the drawing light distribution pattern PAb can be formed in the short-distance region.

At this time, the first projection lens portion 32A and the second projection lens portion 32B are integrally formed with the lens effective surfaces thereof adjacent to each other. Accordingly, the drawing light distribution patterns PAa and PAb can be formed without increasing the size of the lamp.

As described above, according to the present embodiment, in the drawing lamp 10 configured to form the drawing light distribution patterns PAa and PAb, the drawing light distribution patterns PAa and PAb can be formed without increasing the size of the lamp.

Moreover, as in the present embodiment, the first projection lens portion 32A and the second projection lens portion 32B are integrally formed with the lens effective surfaces thereof adjacent to each other. Therefore, since the projection lens 30 is viewed as a single lens, the design of the projection lens 30 can be improved.

The projection lens 30 according to the present embodiment is formed such that the first projection lens portion 32A is larger in size than the second projection lens portion 32B. Therefore, the drawing light distribution pattern PAa formed in the long-distance region is formed with substantially the same sharpness and brightness as the drawing light distribution pattern PAb formed in the short-distance region. Accordingly, it is possible to enhance a reminder function to the surroundings by forming the drawing light distribution patterns PAa and PAb.

Further, the projection lens 30 according to the present embodiment includes the third projection lens portion 32C for close-distance drawing. The third projection lens portion 32C and the second projection lens portion 32B are integrally formed with the lens effective surfaces thereof adjacent to each other. The third opening 40*c* is formed at a portion of the light shielding plate 40 on the rear side of the lamp of the third projection lens portion 32C. The third light emitting element 20C is disposed on a rear side of the lamp of the third opening 40*c*.

That is, with respect to the two drawing light distribution patterns PAa and PAb formed in the long-distance region and the short-distance region, the drawing light distribution pattern PAc can be formed in the close-distance region which is a region closer to the lamp. Therefore, it is possible to form the drawing light distribution pattern PA in which the three drawing light distribution patterns PAa, PAb, and PAc are arranged in series. Accordingly, the reminder function to the surroundings can be further enhanced.

Moreover, the first projection lens portion 32A to the third projection lens portion 32C are integrally formed with the lens effective surfaces thereof adjacent to each other. Accordingly, it is possible to maintain a state where the projection lens 30 is viewed as a single lens.

In addition, in the drawing lamp 10 according to the present embodiment, the first condenser lens 52A to the third condenser lens 52C for causing emitted light from the first light emitting element 20A to the third light emitting element 20C to be incident on the first opening 40Aa to the third opening 40Ca of the light shielding plate 40 are disposed between the first light emitting element 20A to the third light emitting element 20C and the light shielding plate 40. Therefore, the emitted light from the first light emitting element 20A to the third light emitting element 20C is efficiently incident on the first opening 40Aa to the third opening 40Ca. Thus it is easy to form the three drawing light distribution patterns PAa to PAC as bright light distribution patterns.

In the present embodiment, the first opening 40Aa to the third opening 40Ca are formed to have a V-shaped opening shape. However, the first opening 40Aa to the third opening 40Ca may be formed to have other opening shapes. For example, the first opening 40Aa to the third opening 40Ca may be formed to have an opening shape such as a downward arrow or an inverted trapezoidal shape.

In the present embodiment, emitted light from the first light emitting element 20A to the third light emitting element 20C is incident on the first opening 40Aa to the third opening 40Ca via the first condenser lens 52A to the third condenser lens 52C. However, the emitted light from the first light emitting element 20A to the third light emitting element 20C may be directly incident on the first opening 40Aa to the third opening 40Ca.

In the present embodiment, the respective optical axes Axa to Axc of the first projection lens portion 32A to the third projection lens portion 32C extend in the front-rear direction of the lamp at the same height position. However, the first projection lens portion 32A to the third projection lens portion 32C may be configured in other modes. For example, the optical axis Axa of the first projection lens portion 32A may extend upward from the optical axis Axb of the second projection lens portion 32B, and the optical axis Axc of the third projection lens portion 32C may extend downward from the optical axis Axb of the second projection lens portion 32B.

In the present embodiment, although the description has been given assuming that light-emitting colors of the first light emitting element 20A to the third light emitting element 20C are white, other light-emitting colors (for example, amber or red) may be adopted.

In the present embodiment, the drawing lamp 10 is mounted on an end of a front end of the vehicle 100 on a vehicle width direction side, and may be mounted on a rear end, a side surface portion, or the like of the vehicle 100.

In the present embodiment, the drawing light distribution pattern PA is formed on the road surface 2 in front of the vehicle by the irradiation light from the drawing lamp 10. However, the drawing light distribution pattern may be formed on a wall surface disposed in the front of the lamp, a wall surface extending toward the front of the lamp, or the like.

Next, a modification of the first embodiment will be described.

First, a first modification of the first embodiment will be described.

Figure 10:
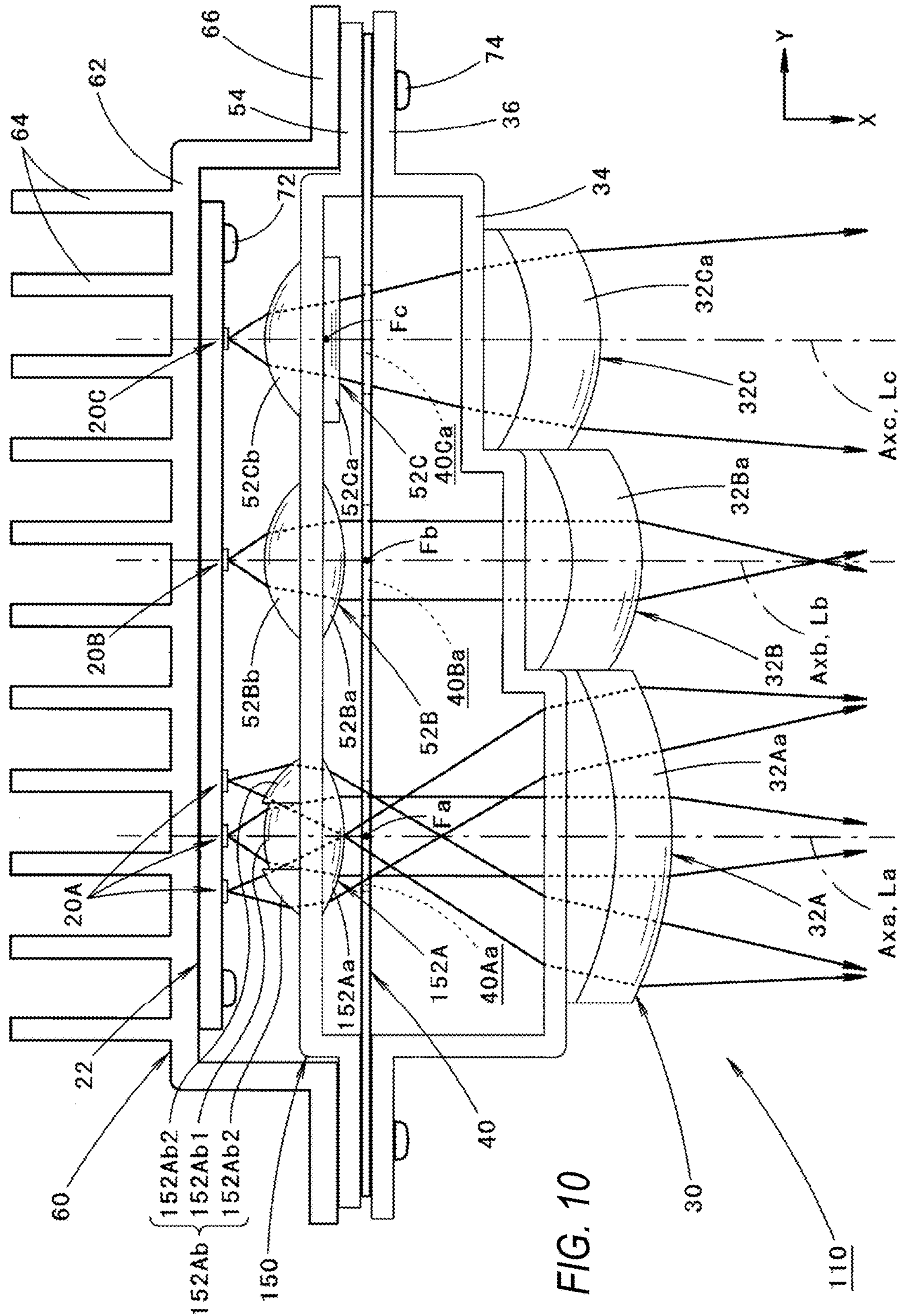
FIG. 10 is a plan view illustrating a drawing lamp according to a first modification of the first embodiment.

FIG. 10 is a plan view illustrating a drawing lamp 110 according to the first modification of the first embodiment.

A basic configuration of the present modification is similar to that of the first embodiment, but the number of first light emitting elements 20A and the configuration of a condenser lens assembly 150 are partially different from those of the first embodiment.

The drawing lamp 110 according to the present modification is different from the first embodiment in the configuration of a first condenser lens 152A of the condenser lens assembly 150.

Specifically, the first condenser lens 152A includes a convex curved surface portion 152Ab1 in which a rear surface 152Ab of the first condenser lens 152A is located on the first reference axis line La, and a pair of convex curved surface portions 152Ab2 located on both left and right sides of the convex curved surface portion 152Ab1.

In the present modification, three light emitting elements are disposed as the first light emitting element 20A.

The three first light emitting elements 20A are disposed behind the lamp of the convex curved surface portion 152Ab1 and behind the lamp of the pair of left and right convex curved surface portions 152Ab2 (that is, on the first reference axis line La and both left and right sides thereof).

The configuration of a front surface 152Aa of the first condenser lens 152A is similar to that of the first embodiment.

Emitted light from the first light emitting element 20A located at the center is mainly incident on the first condenser lens 152A from the convex curved surface portion 152Ab1, and then is emitted from a front surface 152Aa of the first condenser lens 152A to reach the first opening 40Aa of the light shielding plate 40. Emitted light from the pair of left and right first light emitting elements 20A located on both left and right sides are mainly incident on the first condenser lens 152A from the pair of left and right convex curved surface portions 152Ab2, and then is emitted from the front surface 152Aa of the first condenser lens 152A to reach the first opening 40Aa of the light shielding plate 40.

It is not easy to sufficiently ensure the brightness of the drawing light distribution pattern PAa formed in the long-distance region. However, since the drawing light distribution pattern PAa is formed by the emitted light from the three first light emitting elements 20A as in the present modification, the brightness of the drawing light distribution pattern PAa can be sufficiently secured.

In addition, in the first condenser lens 152A disposed between the three first light emitting elements 20A and the light shielding plate 40, the rear surface 152Ab of the first condenser lens 152A includes the convex curved surface portion 152Ab1 and the pair of left and right convex curved surface portions 152Ab2. The first light emitting elements 20A are disposed on the rear side of the lamp of the convex curved surface portion 152Ab1 and the pair of left and right convex curved surface portions 152Ab2. Therefore, emitted light from the three first light emitting elements 20A is efficiently incident on the first opening 40Aa of the light shielding plate 40. Accordingly, the brightness of the drawing light distribution pattern PAa can be further increased.

Next, a second modification of the first embodiment will be described.

Figure 11:
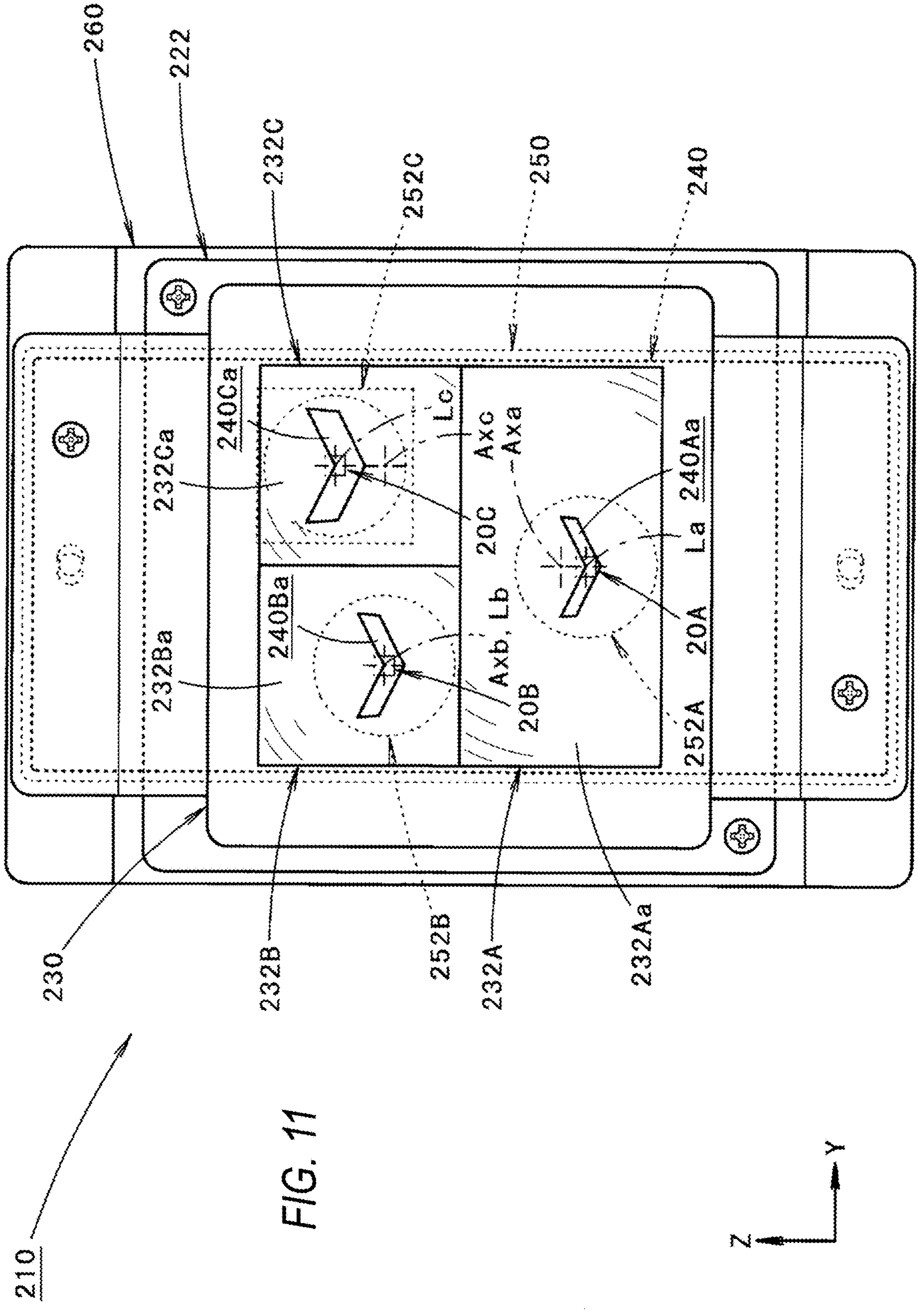
FIG. 11 is a plan view illustrating a drawing lamp according to a second modification of the first embodiment.

FIG. 11 is a plan view illustrating a drawing lamp 210 according to the second modification of the first embodiment.

A basic configuration of the present modification is similar to that of the first embodiment, but a configuration of a projection lens 230 is different from that of the first embodiment. Accordingly, the arrangement of the first light emitting element 20A to the third light emitting element 20C and the configurations of a substrate 222, a light shielding plate 240, a condenser lens assembly 250, and a heat sink 260 are different from those in the first embodiment.

That is, the projection lens 230 according to the present modification also includes a first projection lens portion 232A, a second projection lens portion 232B, and a third projection lens portion 232C. However, the arrangement and outer shape of each of the first projection lens portion 232A, the second projection lens portion 232B, and the third projection lens portion 232C are different from those in the first embodiment.

Specifically, the projection lens 230 according to the present modification is also formed such that the first projection lens portion 232A is larger in size than each of the second projection lens portion 232B and the third projection lens portion 232C. The second projection lens portion 232B and the third projection lens portion 232C are disposed adjacent to each other in the left-right direction. The first projection lens portion 232A is disposed below and adjacent to the second projection lens portion 232B and the third projection lens portion 232C.

The first projection lens portion 232A is formed to have a horizontally long rectangular outer shape in the front view of the lamp. On the other hand, each of the second projection lens portion 232B and the third projection lens portion 232C is formed to have a rectangular outer shape close to a square in a front view of the lamp. At this time, an up-down width of the first projection lens portion 232A and an up-down width of each of the second projection lens portion 232B and the third projection lens portion 232C are substantially the same. A left-right width of the first projection lens portion 232A is substantially the same as a total left-right width of the second projection lens portion 232B and the third projection lens portion 232C.

As described above, the projection lens 230 according to the present modification is integrally formed in a state where the second projection lens portion 232B, the third projection lens portion 232C, and the first projection lens portion 232A are arranged in two upper and lower stages, and the lens effective surfaces are adjacent to each other.

Also in the projection lens 230 according to the present modification, the first projection lens portion 232A to the third projection lens portion 232C are all formed in a plano-convex lens shape. Curvatures of front surfaces 232Aa, 232Ba, and 232Ca are substantially the same as those in the first embodiment.

The first light emitting element 20A to the third light emitting element 20C are disposed on the first reference axis line La to the third reference axis line Lc. A positional relationship between the first reference axis line La to the third reference axis line Lc and the optical axes Axa to Axc of the first projection lens portion 232A to the third projection lens portion 232C is the same as that in the first embodiment.

A first opening 240Aa, a second opening 240Ba, and a third opening 240Ca having the same shapes as those in the first embodiment are also formed in the light shielding plate 240 according to the present modification. A positional relationship between the first opening 240Aa to the third opening 240Ca and the optical axes Axa to Axc of the first projection lens portion 232A to the third projection lens portion 232C is the same as that in the first embodiment.

Further, the condenser lens assembly 250 according to the present modification example is also provided with a first condenser lens 252A, a second condenser lens 252B, and a third condenser lens 252C having the same shapes as those of the above embodiment. Similarly to the first embodiment, the first condenser lens 252A to the third condenser lens 252C are formed on the first reference axis line La to the third reference axis line Lc, respectively.

In the present modification, the projection lens 230, the light shielding plate 240, and the condenser lens assembly 250 are positioned and supported with respect to the heat sink 260 on both upper and lower sides of the first projection lens portion 232A to the third projection lens portion 232C.

Even in a case where the configuration of the present modification is adopted, it is possible to obtain the same operation and effect as in the case of the first embodiment.

Further, by adopting the configuration of the present modification, the drawing lamp 210 is configured as a lamp having a small left-right width.

The drawing lamp according to the first embodiment and the modifications thereof may be an in-vehicle lamp or may be a lamp used for a purpose other than the on-vehicle purpose.

A specific shape and size of each of the first projection lens portion for long-distance drawing and the second projection lens portion for short-distance drawing are not particularly limited as long as the projection lens is integrally formed in a state where the first projection lens portion and the second projection lens portion are aligned in a required direction intersecting the front-rear direction of the lamp and the lens effective surfaces thereof are adjacent to each other.

A specific direction of the "required direction intersecting the front-rear direction of the lamp" is not particularly limited, and can adopt, for example, a left-right direction or an upper-lower direction.

The "state where the lens effective surfaces thereof are adjacent to each other" means a state where the lens effective surface of the first projection lens portion and the lens effective surface of the second projection lens portion appear to be connected to each other in the front view of the lamp, and the lens effective surface of the first projection lens portion and the lens effective surface of the second projection lens portion may be displaced from each other in the front-rear direction of the lamp.

In the "first projection lens portion for long-distance drawing" and the "second projection lens portion for short-distance drawing", as long as the drawing light distribution pattern formed by the second projection lens portion is configured to be positioned in the short-distance region more than the drawing light distribution pattern formed by the irradiation light from the first projection lens portion, a specific drawing position by each of the first projection lens portion and the second projection lens portion is not particularly limited.

The specific arrangement of the "light shielding plate" is not particularly limited as long as the light shielding plate is configured to shield a part of light traveling from the light emitting element to the projection lens between the light emitting element and the projection lens.

A specific opening shape of each of the "first opening and the second opening" is not particularly limited.

The specific arrangement of the "first light emitting element and the second light emitting element" is not particularly limited as long as the first light emitting element and the second light emitting element are disposed on the rear side of the lamp of the first opening and the second opening.

Second Embodiment

Figure 12:
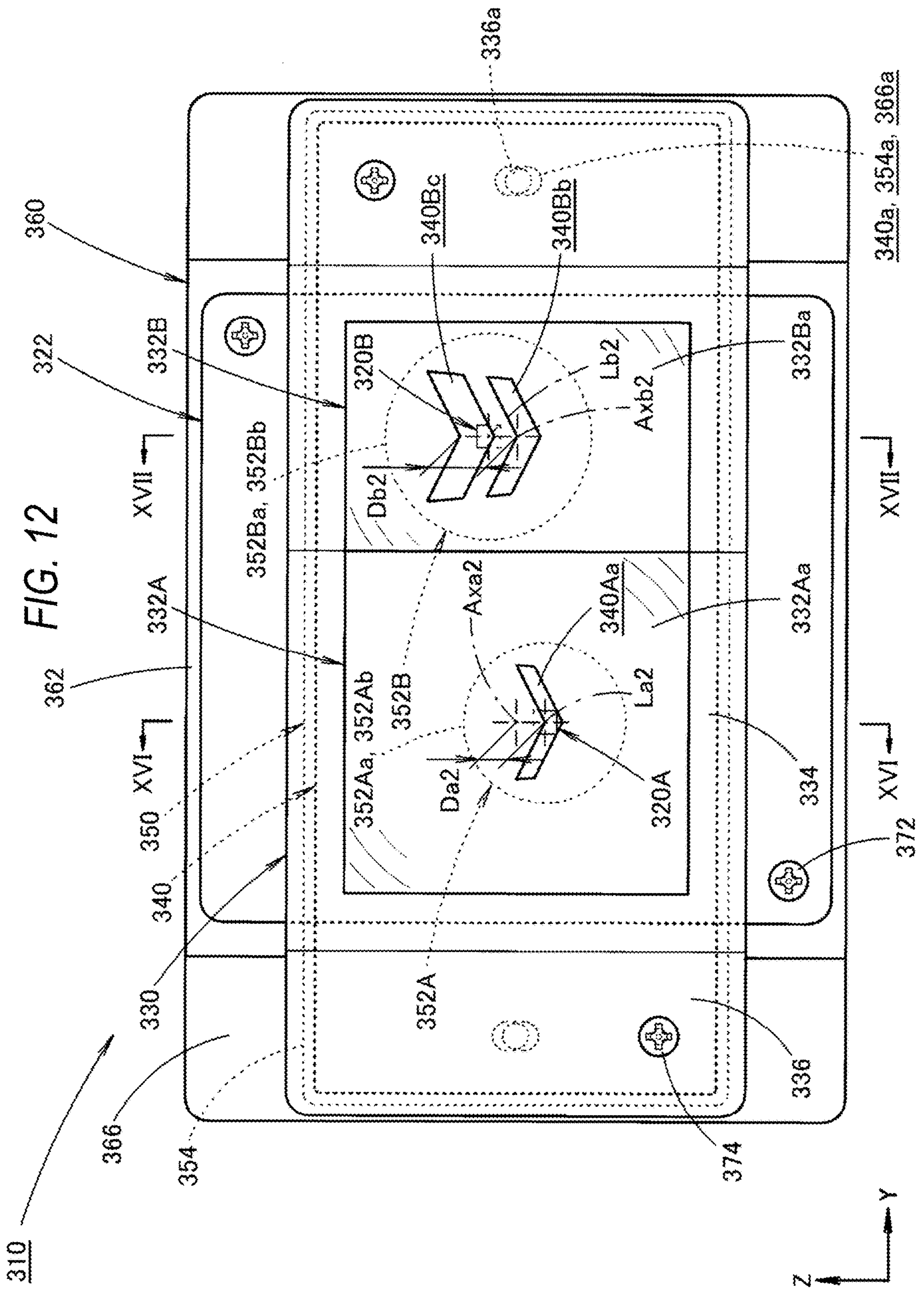
FIG. 12 is a front view illustrating a drawing lamp according to a second embodiment of the present disclosure.
Figure 13:
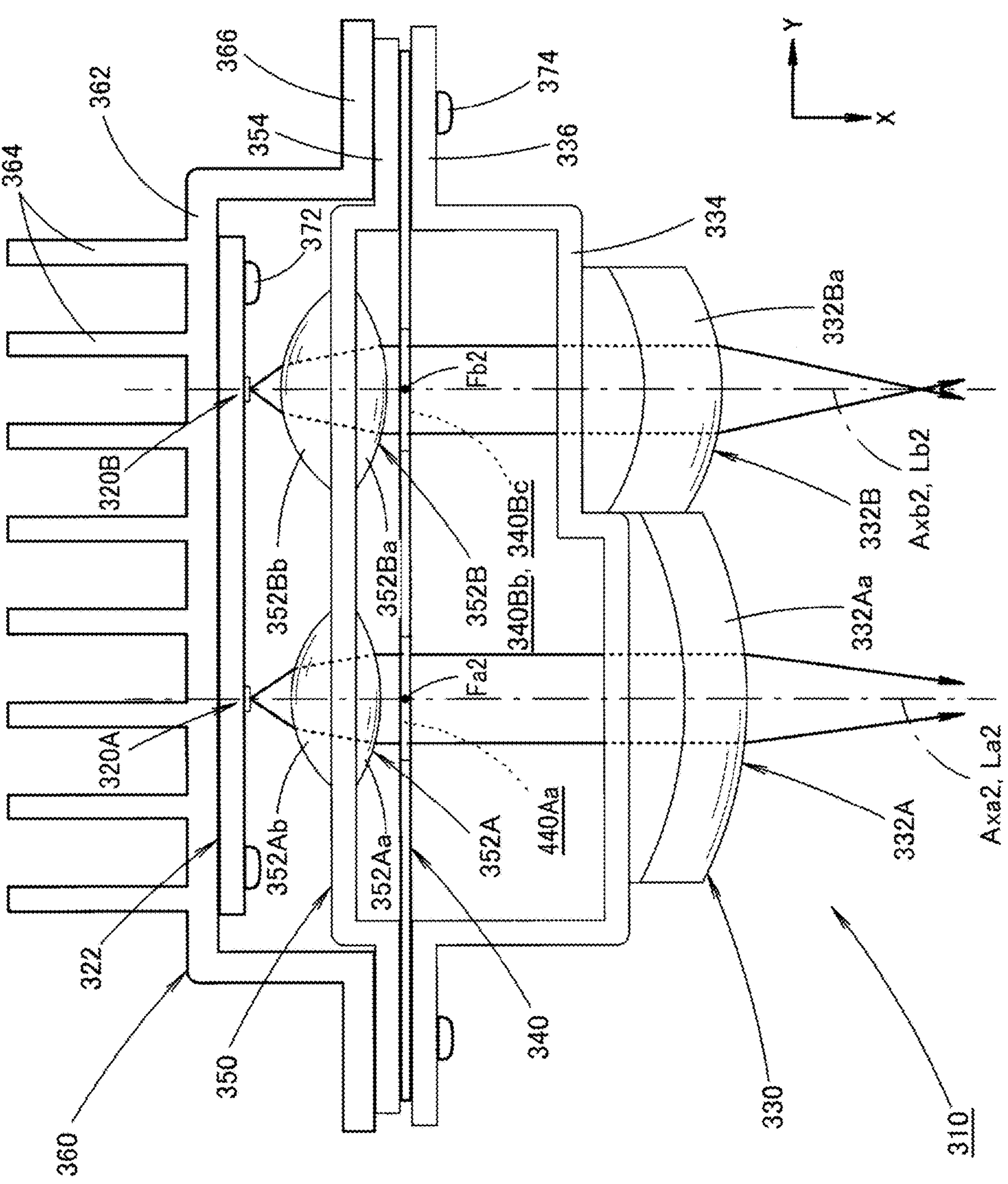
FIG. 13 is a plan view illustrating the drawing lamp according to the second embodiment.
Figure 14:
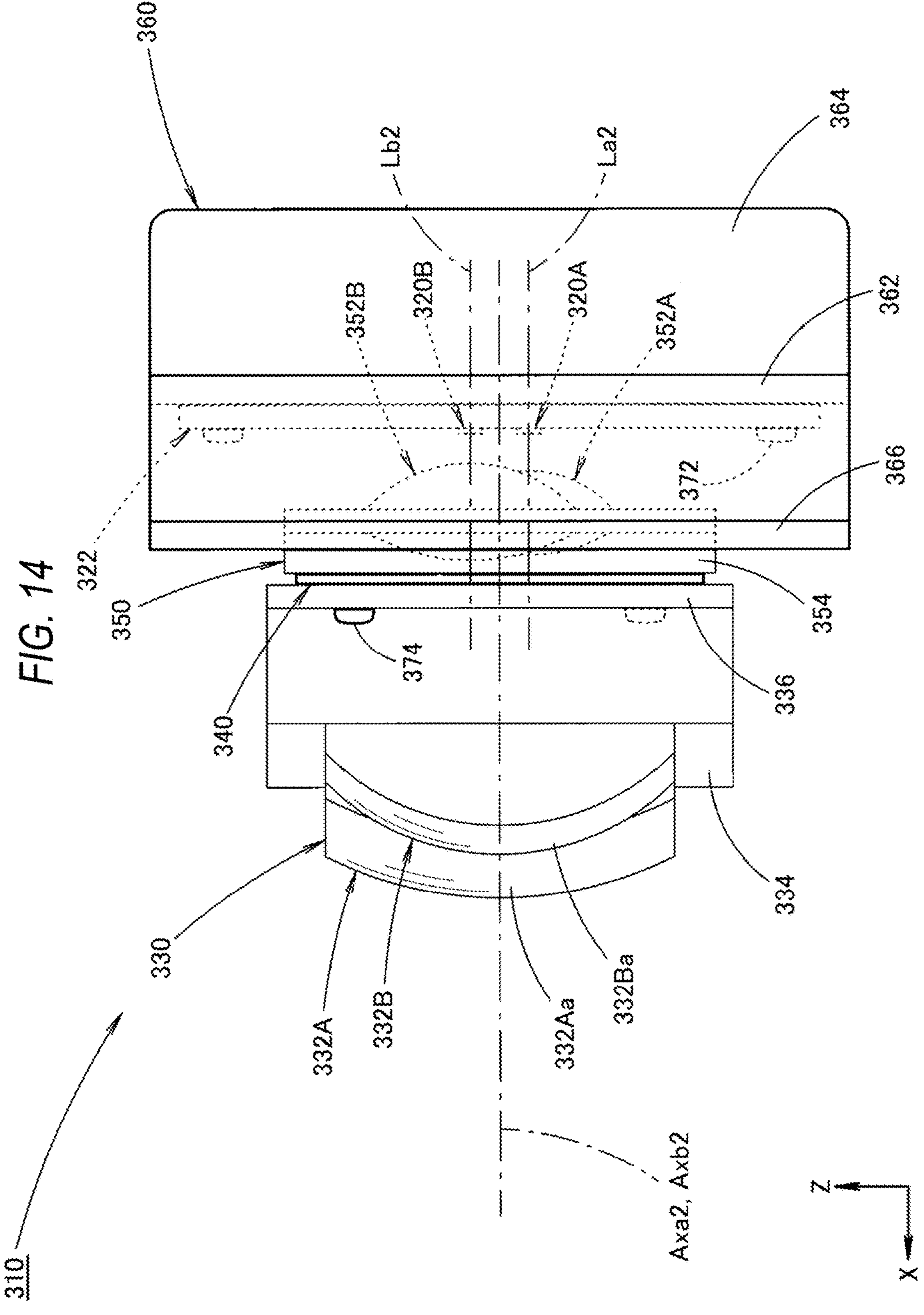
FIG. 14 is a side view illustrating the drawing lamp according to the second embodiment.
Figure 15:
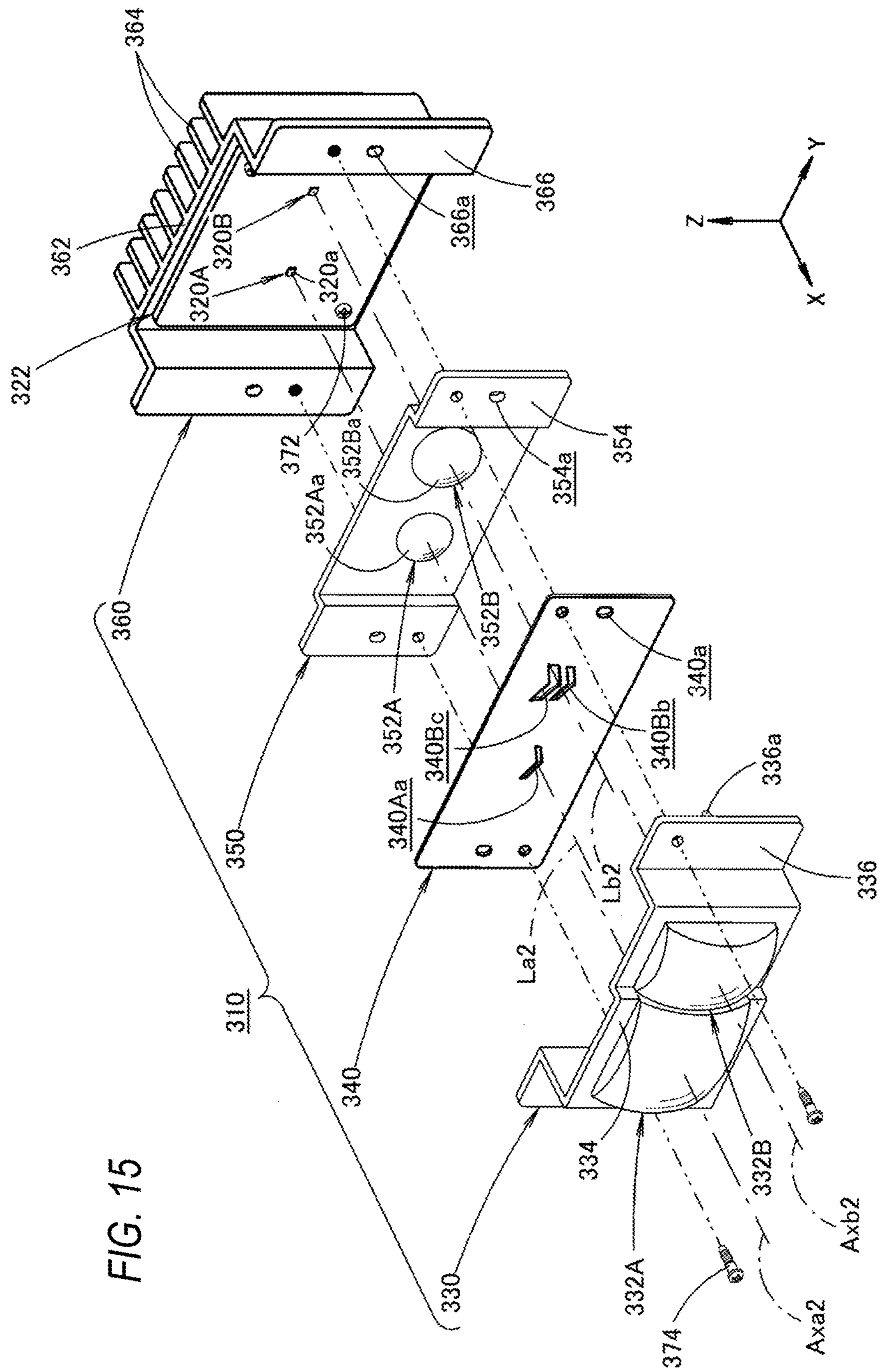
FIG. 15 is an exploded perspective view illustrating main components of the drawing lamp according to the second embodiment.

FIG. 12 is a front view illustrating a drawing lamp 310 according to a second embodiment of the present disclosure. FIG. 13 is a plan view illustrating the drawing lamp 310 according to the second embodiment. FIG. 14 is a side view illustrating the drawing lamp 310 according to the second embodiment. FIG. 15 is an exploded perspective view illustrating main components of the drawing lamp 310 according to the second embodiment.

Before describing a specific configuration of the drawing lamp 310 according to the present embodiment, an outline thereof will be described.

Figure 18:
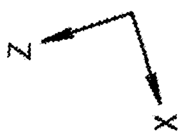
FIG. 18 is a side view illustrating a state where drawing lamps are mounted on a vehicle.
Figure 18:
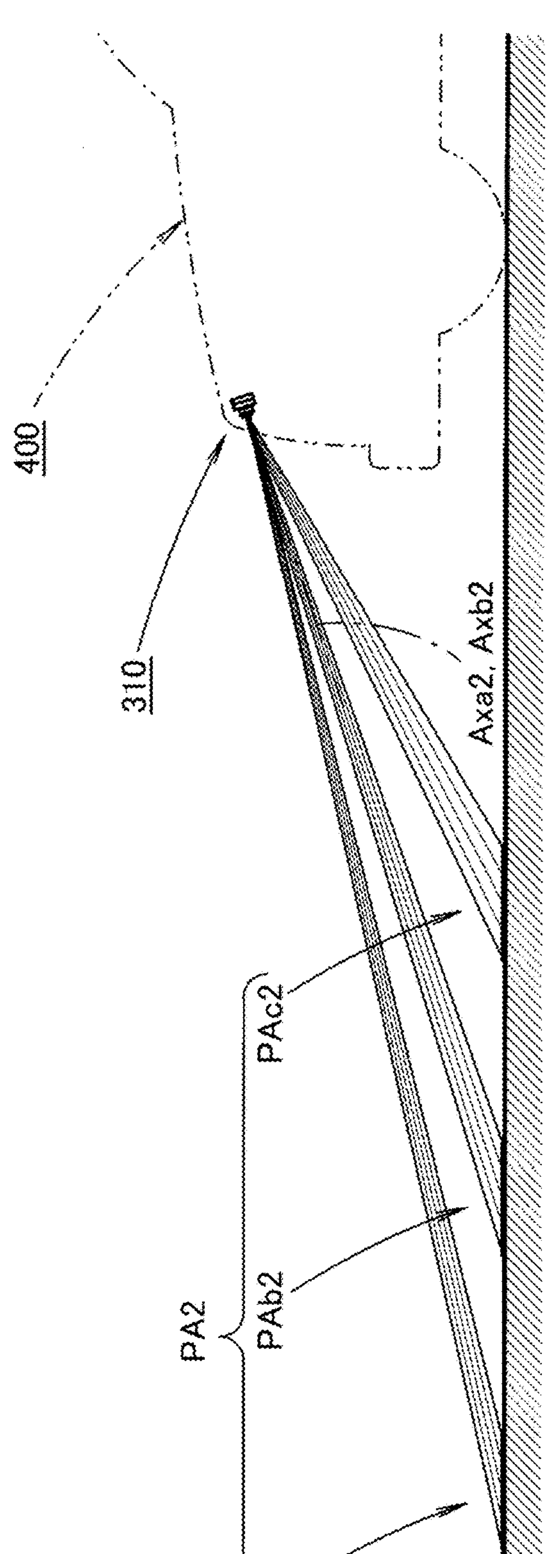
Figure 19:
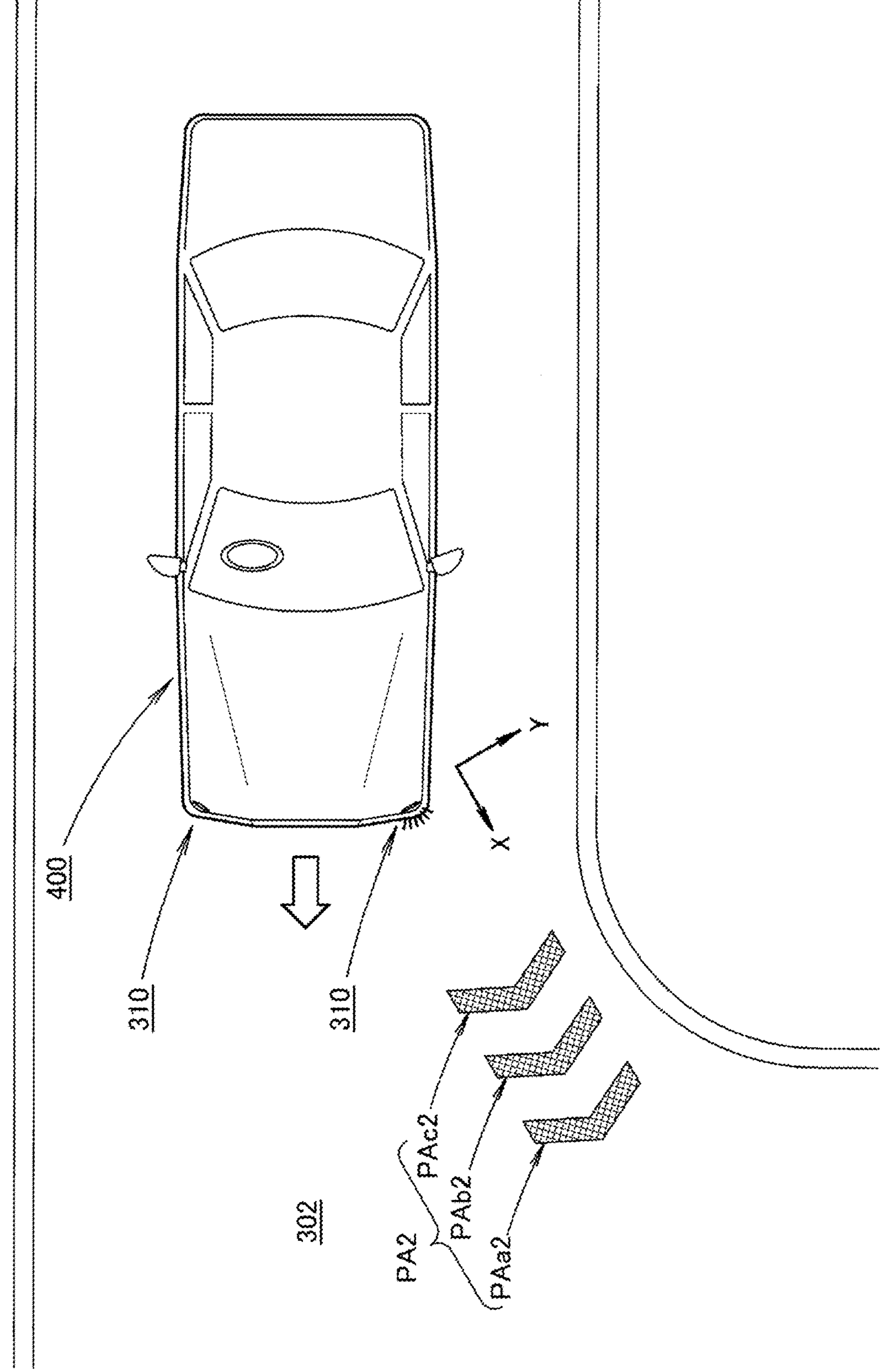
FIG. 19 is a plan view illustrating a state where the drawing lamps are mounted on the vehicle.

FIG. 18 is a side view illustrating a state where the drawing lamps 310 are mounted on a vehicle 400. FIG. 19 is a plan view illustrating a state where the drawing lamps 310 are mounted on the vehicle 400. FIG. 19 illustrates a state where the left drawing lamps 310 are turned on.

As illustrated in FIGS. 18 and 19, the drawing lamp 310 emits light obliquely downward toward the outside in a vehicle width direction in a state of being mounted on an end on a vehicle width direction side in a front end of the vehicle 400. At this time, the drawing lamp 310 is turned on in synchronization with turning on of a front turn signal lamp (not illustrated), thereby forming the drawing light distribution pattern PA on a road surface 302 in front of the vehicle.

As illustrated in FIGS. 18 and 19, in the state where the drawing lamps 310 are mounted on the vehicle 400, a front surface of the lamp faces a direction inclined obliquely downward with respect to a front-rear direction of the vehicle. However, as illustrated in FIGS. 12 to 15, when the drawing lamp 310 is formed as a single piece, the front surface of the lamp faces a horizontal direction.

Next, a specific configuration of the drawing lamp 310 will be described.

Figure 16:
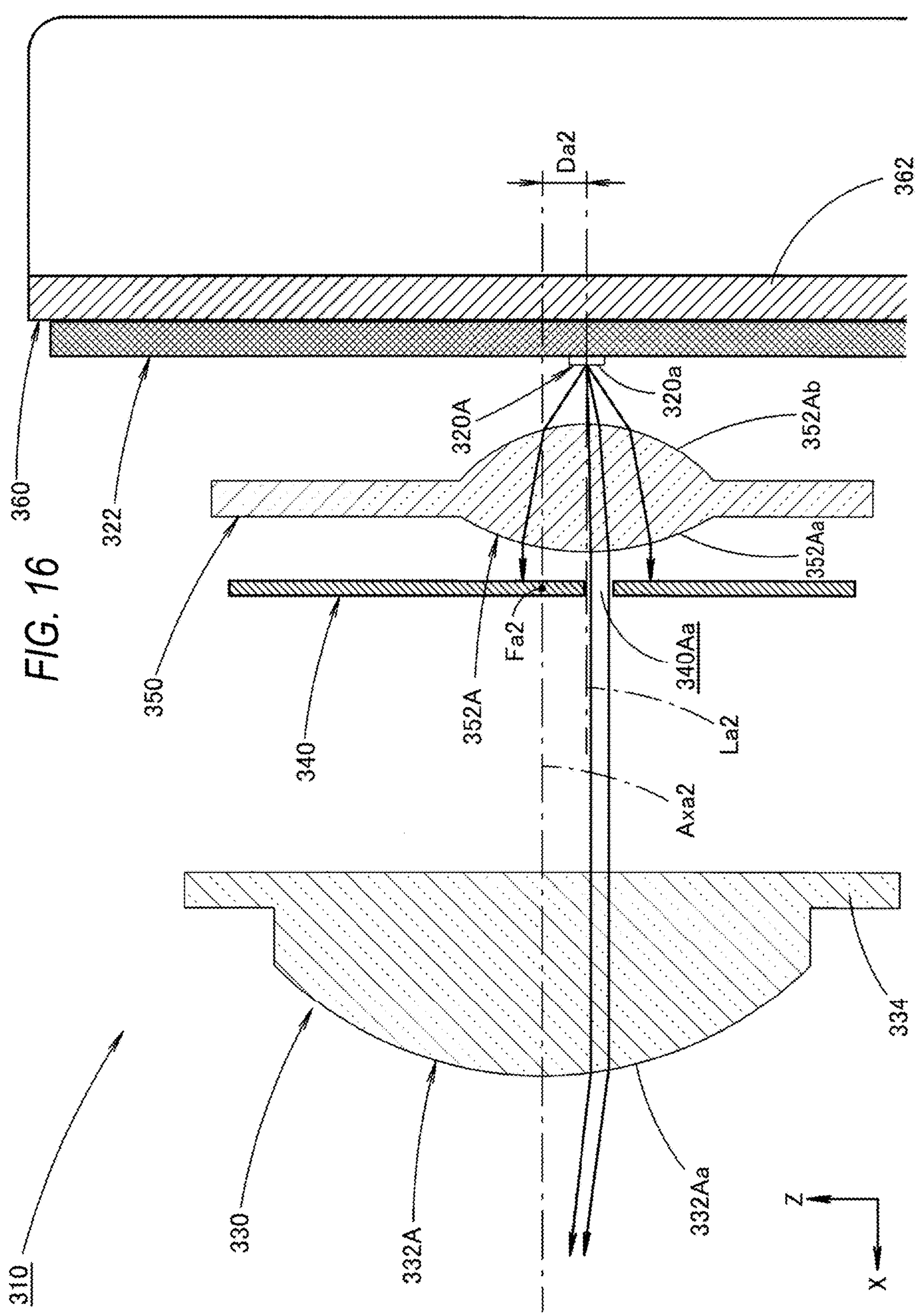
FIG. 16 is a cross-sectional view taken along a line XVI-XVI in FIG. 12.
Figure 17:
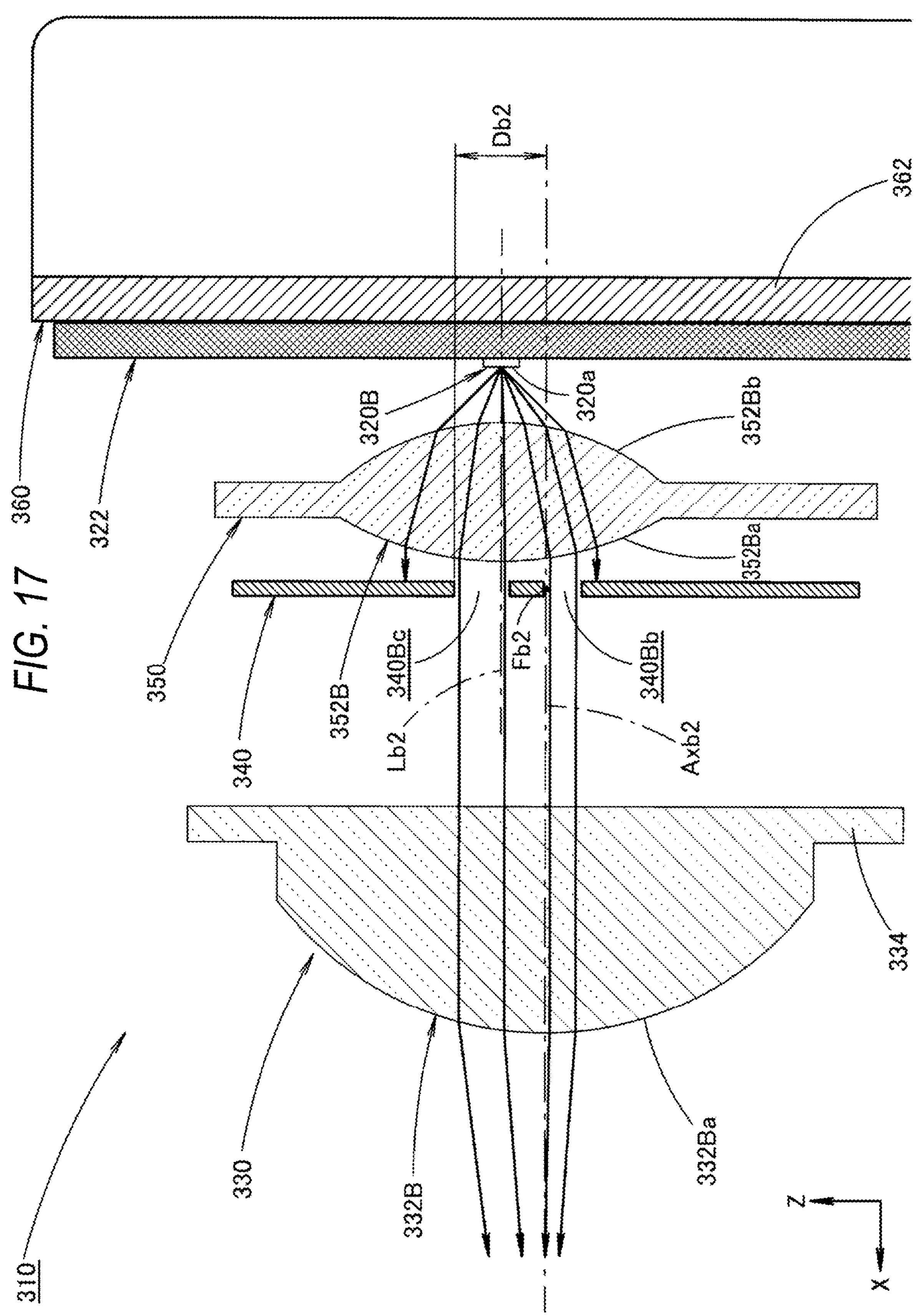
FIG. 17 is a cross-sectional view taken along a line XVII-XVII in FIG. 12.

FIG. 16 is a cross-sectional view taken along a line XVI-XVI in FIG. 12. FIG. 17 is a cross-sectional view taken along a line XVII-XVII in FIG. 12.

As illustrated in FIGS. 16 and 17, the drawing lamp 310 is configured to emit emitted light from a light emitting element toward the front of the lamp via a projection lens 330. The drawing lamp 310 includes a first light emitting element 320A and a second light emitting element 320B as light emitting elements.

In the projection lens 330, a first projection lens portion 332A and a second projection lens portion 332B is integrally formed in a state where the first projection lens portion 332A and the second projection lens portion 332B are aligned in the left-right direction. The first projection lens portion 332A and the second projection lens portion 332B are formed such that respective optical axes Axa2 and Axb2 extend in the front-rear direction of the lamp at the same height position.

The first projection lens portion 332A located on a right side (left side in the front view of the lamp) is a projection lens portion for long-distance drawing. The second projection lens portion 332B located on a left side is a projection lens portion for short-distance drawing.

Respective front surfaces 332Aa and 332Ba of the first projection lens portion 332A and the second projection lens portion 332B are plano-convex lenses formed by convex curved surfaces, and are formed to have a rectangular outer shape in the front view of the lamp. The first projection lens portion 332A and the second projection lens portion 332B are integrally formed with lens effective surfaces thereof, which is the front surfaces 332Aa and 332Ba achieving a lens function, adjacent to each other.

Specifically, the first projection lens portion 332A and the second projection lens portion 332B are formed to have the same up-down width. However, a left-right width of the first projection lens portion 332A is larger than a left-right width of the second projection lens portion 332B. That is, the first projection lens portion 332A is formed to have a substantially square outer shape in the front view of the lamp. The second projection lens portion 332B is formed to have a vertically long rectangular outer shape in a front view of the lamp.

The second projection lens portion 332B is disposed at a position displaced to the rear side of the lamp with respect to the first projection lens portion 332A. At this time, rear foci Fa2 and Fb2 of the first projection lens portion 332A and the second projection lens portion 332B are set at the same position in the front-rear direction of the lamp. That is, a focal length of the first projection lens portion 332A is larger than a focal length of the second projection lens portion 332B.

The first projection lens portion 332A and the second projection lens portion 332B are surrounded by an outer peripheral flange portion 334 formed to extend in a stepwise manner along the respective rear surfaces. A pair of mounting flange portions 336 are formed on both left and right sides of the outer peripheral flange portion 334. The pair of left and right mounting flange portions 336 have different lengths in the front-rear direction of the lamp, and are formed to have an L shape in a horizontal cross section. Rear end surfaces of the pair of left and right mounting flange portions 336 are formed to be located on the same plane orthogonal to the front-rear direction of the lamp.

Each of the first light emitting element 320A and the second light emitting element 320B is a white light emitting diode, and has a rectangular (specifically, square) light emitting surface 320*a*.

The first light emitting element 320A and the second light emitting element 320B are mounted on a common substrate 322 in a state of being disposed on the rear side of the lamp of the first projection lens portion 332A and the second projection lens portion 332B. The substrate 322 is supported by a heat sink 360 in a state of being disposed to extend along a plane orthogonal to the front-rear direction of the lamp.

A light shielding plate 340 for shielding a part of light from the first light emitting element 320A and the second light emitting element 320B toward the first projection lens portion 332A and the second projection lens portion 332B is disposed between the first light emitting element 320A and the second light emitting element 320B, and the first projection lens portion 332A and the second projection lens portion 332B. The light shielding plate 340 is implemented by a thin plate extending along the plane orthogonal to the front-rear direction of the lamp.

The light shielding plate 340 is positioned in a state of being in contact with the pair of left and right mounting flange portions 336 of the projection lens 330 from the rear side of the lamp at both left and right ends. Accordingly, the light shielding plate 340 is disposed along a vertical surface including the rear foci Fa2 and Fb2 of the first projection lens portion 332A and the second projection lens portion 332B.

A first opening 340Aa is formed in a portion of the light shielding plate 340 on a rear side of the lamp of the first projection lens portion 332A. Two second openings 340Bb and 340Bc are formed in portions of the light shielding plate 340 on the rear side of the lamp of the second projection lens portion 332B.

The first opening 340Aa and the two second openings 340Bb and 340Bc are each formed to have a V-shaped opening shape in the front view of the lamp. At this time, an opening angle of the V-shaped opening is a value of about 90° to 150° (for example, a value of about 120°).

In the first opening 340Aa and the two second openings 340Bb and 340Bc, the second opening 340Bb is located on an upper side of the first opening 340Aa. The second opening 340Bc is located on an upper side of the second opening 340Bb.

Specifically, the first opening 340Aa is formed such that a lower end of a central portion of an upper inner peripheral edge of the first opening 340Aa is located below the optical axis Axa2 of the first projection lens portion 332A. The second opening 340Bb is formed such that a lower end of a central portion of an upper inner peripheral edge of the second opening 340Bb is located on the optical axis Axb2 of the second projection lens portion 332B. The second opening 340Bc is formed such that a lower end of a central portion of an upper inner peripheral edge of the second opening 340Bc is located on an upper side of the optical axis Axb2 of the second projection lens portion 332B. At this time, an upper displacement amount Db2 of the lower end of the central portion of the upper inner peripheral edge of the second opening 340Bc from the optical axis Axb2 is larger than a lower displacement amount Da2 of the lower end of the central portion of the upper inner peripheral edge of the first opening 340Aa from the optical axis Axa2.

In the first opening 340Aa and the two second openings 340Bb and 340Bc, the second opening 340Bb is formed to have a larger up-down width than the first opening 340Aa. The second opening 340Bc has a larger up-down width than the second opening 340Bb.

Further, the first opening 340Aa and the two second openings 340Bb and 340Bc are configured such that inner peripheral edges thereof on both left and right sides all extend upward in a direction slightly expanding with respect to the vertical direction. The second opening 340Bb is formed to have a left-right width slightly larger than that of the first opening 340Aa. The second opening 340Bc is formed to have a left-right width slightly larger than that of the second opening 340Bb.

The first light emitting element 320A is disposed on a lower side of the optical axis Axa2 of the first projection lens portion 332A. The second light emitting element 320B is disposed on an upper side of the optical axis Axb2 of the second projection lens portion 332B.

Specifically, the first light emitting element 320A is disposed such that a light emitting center thereof is located on the first reference axis line La2 extending in the front-rear direction of the lamp on the lower side of the optical axis Axa2. The second light emitting element 320B is disposed such that a light emitting center is located on a second reference axis line Lb2 extending in the front-rear direction of the lamp on the upper side of the optical axis Axb2. At this time, the first reference axis line La2 is located at a position passing through the lower end of the central portion of the upper inner peripheral edge of the first opening 340Aa of the light shielding plate 340. The second reference axis line Lb2 is located at a position where an upper displacement amount of the second reference axis line Lb2 from the optical axis Axb2 is the same as a lower displacement amount of the first reference axis line La2 from the optical axis Axa2.

The first light emitting element 320A and the second light emitting element 320B are connected to an electronic control unit (not illustrated), and are turned on and off by the electronic control unit according to a vehicle travel state or the like.

A condenser lens assembly 350 is disposed between the substrate 322 and the light shielding plate 340.

The condenser lens assembly 350 is integrally formed via a plate-shaped portion with the first condenser lens 352A and the second condenser lens 352B aligned in the left-right direction. The first condenser lens 352A and the second condenser lens 352B are located on the first reference axis line La2 and the second reference axis line Lb2.

Respective rear surfaces 352Ab and 352Bb of the first condenser lens 352A and the second condenser lens 352B are formed in a convex curved surface shape. Front surfaces 352Aa and 352Ba are formed in a convex curved surface shape having a smaller curvature than the rear surfaces 352Ab and 352Bb.

Accordingly, the first condenser lens 352A causes emitted light from the first light emitting element 320A to be incident on the first opening 340Aa of the light shielding plate 340 as light parallel to the first reference axis line La2. In addition, the second condenser lens 352B causes emitted light from the second condenser lens 352B to be incident on the two second openings 340Bb and 340Bc of the light shielding plate 340 as light parallel to the second reference axis line Lb2*c*.

The condenser lens assembly 350 has a pair of mounting flange portions 354 formed on both left and right sides of the plate-shaped portion located around the first condenser lens 352A and the second condenser lens 352B. The pair of left and right mounting flange portions 354 are formed to have an L shape in a horizontal cross section. Front end surfaces of the pair of left and right mounting flange portions 354 come into contact with both left and right ends of the light shielding plate 340 from the rear side of the lamp. Accordingly, the first condenser lens 352A and the second condenser lens 352B are positioned on the first reference axis line La2 and the second reference axis line Lb2.

The heat sink 360 includes a body portion 362 extending along a plane orthogonal to the front-rear direction of the lamp, a plurality of heat-dissipating fins 364 extending from the body portion 362 toward the rear of the lamp along the vertical surface, and a pair of mounting flange portions 366 formed on both left and right side portions of the body portion 362.

The substrate 322 is positioned and supported by fastening screws 372 at two locations on a diagonal line of the substrate 322 in a state of being in surface contact with the body portion 362 of the heat sink 360.

The projection lens 330, the light shielding plate 340, and the condenser lens assembly 350 are positioned and supported on the pair of left and right mounting flange portions 366 of the heat sink 360 by fastening screws 374 at two locations on a diagonal line thereof. The pair of left and right mounting flange portions 336 of the projection lens 330, both the left and right ends of the light shielding plate 340, and the pair of left and right mounting flange portions 354 of the condenser lens assembly 350 are screwed together in a state of overlapping the pair of left and right mounting flange portions 366 of the heat sink 360. The pair of left and right mounting flange portions 336 of the projection lens 330 are each provided with a positioning pin 336*a*. Pin insertion holes 340*a*, 354*a*, and 366*a* into which the positioning pins 336*a* are to be inserted are respectively formed in both the left and right ends of the light shielding plate 340, the pair of left and right mounting flange portions 354 of the condenser lens assembly 350, and the pair of left and right mounting flange portions 366 of the heat sink 360.

Next, a drawing light distribution pattern PA2 illustrated in FIGS. 18 and 19 will be described.

As described above, the drawing light distribution pattern PA2 is formed by the irradiation light from the drawing lamp 310. The drawing light distribution pattern PA2 includes three drawing light distribution patterns PAa2, PAb2, and PAc2 as illustrated in FIGS. 18 and 19.

Each of the three drawing light distribution patterns PAa2, PAb2, and PAc2 is an inverted V-shaped light distribution pattern, which is a shape pointed toward the front of the lamp. The three drawing light distribution patterns PAa2, PAb2, and PAc2 have substantially the same size and are arranged in series at substantially equal intervals. The three drawing light distribution patterns PAa2, PAb2, and PAc2 are formed in a long-distance region, a short-distance region, and a close-distance region of the road surface 302 in front of the vehicle, respectively.

The first drawing light distribution pattern PAa2 formed in the long-distance region is a light distribution pattern formed by the emitted light from the first light emitting element 320A toward the front of the lamp via the first projection lens portion 332A.

The drawing light distribution pattern PAa2 is formed as a reverse projection image of light emitted from the first light emitting element 320A and passing through the first opening 340Aa formed in the light shielding plate 340 to have a V-shaped opening shape.

At this time, the first opening 340Aa is formed such that a lower end of a central portion of an upper inner peripheral edge of the first opening 340Aa is located on a lower side of the optical axis Axa2 of the first projection lens portion 332A. Therefore, the light passing through the first opening 340Aa is emitted toward the front of the lamp as light upward from the optical axis Axa2. Accordingly, the drawing light distribution pattern PAa2 is formed in the long-distance region.

The emitted light from the first light emitting element 320A is efficiently incident on the first opening 340Aa by the first condenser lens 352A having a biconvex lens shape. Accordingly, the brightness of the drawing light distribution pattern PAa2 is sufficiently secured. Moreover, since the first light emitting element 320A and the first condenser lens 352A are disposed on the first reference axis line La2, the brightness of the drawing light distribution pattern PAa2 is sufficiently secured.

The drawing light distribution patterns PAb2 and PAc2 formed in the short-distance region and the close-distance region are light distribution patterns formed by emitted light from the second light emitting element 320B toward the front of the lamp via the second projection lens portion 332B.

The drawing light distribution pattern PAb2 is formed as a reverse projection image of light passing through the second opening 340Bb formed to have a V-shaped opening shape in the light shielding plate 340.

At this time, the second opening 340Bb is formed such that a lower end of a central portion of an upper inner peripheral edge of the second opening 340Bb is located on the optical axis Axb2 of the second projection lens portion 332B. Therefore, the light is emitted toward the front of the lamp as light substantially parallel to the optical axis Axb2. Accordingly, the drawing light distribution pattern PAb2 is formed in the short-distance region.

The drawing light distribution pattern PAc2 is formed as a reverse projection image of light passing through the second opening 340Bc formed to have a V-shaped opening shape in the light shielding plate 340.

At this time, the second opening 340Bc is formed such that a lower end of a central portion of an upper inner peripheral edge of the second opening 340Bc is located on an upper side of the optical axis Axb2 of the second projection lens portion 332B. Therefore, the light passing through the second opening 340Bc is emitted toward the front of the lamp as light downward from the optical axis Axb2. Therefore, the drawing light distribution pattern PAc2 is formed in the close-distance region.

In addition, the emitted light from the second light emitting element 320B is efficiently incident on the two second openings 340Bb and 340Bc by the second condenser lens 352B having a biconvex lens shape. Accordingly, the brightness of the two drawing light distribution patterns PAb2 and PAc2 is sufficiently secured.

Further, the upper displacement amount Db2 of the lower end of the central portion of the upper inner peripheral edge of the second opening 340Bc from the optical axis Axb2 is larger than the lower displacement amount Da2 of the lower end of the central portion of the upper inner peripheral edge of the first opening 340Aa from the optical axis Axa2. Although irradiation angles of the emitted light from the first projection lens portion 332A and the second projection lens portion 332B with respect to the road surface 302 in front of the vehicle are different from each other, an interval between the drawing light distribution pattern PAb2 and the drawing light distribution pattern PAc2 has substantially the same value as an interval between the drawing light distribution pattern PAa2 and the drawing light distribution pattern PAb2.

Up-down widths of the first opening 340Aa, the second opening 340Bb, and the second opening 340Bc increase in this order. In addition, inner peripheral edges on both left and right sides of the first opening 340Aa, the second opening 340Bb, and the second opening 340Bc all extend upward in a direction slightly expanding with respect to the vertical direction. in addition, left-right widths of the first opening 340Aa, the second opening 340Bb, and the second opening 340Bc increase in this order. Accordingly, the three drawing light distribution patterns PAa2 to PAc2 are formed in substantially the same size.

Next, operations of the present embodiment will be described.

The drawing lamp 310 according to the present embodiment forms the drawing light distribution pattern PA2 by emitting the emitted light from the first light emitting element 320A and the second light emitting element 320B toward the front of the lamp via the projection lens 330. The projection lens 330 is disposed in a state where the first projection lens portion 332A for long-distance drawing and the second projection lens portion 332B for short-distance drawing are aligned in the left-right direction (a required direction intersecting the front-rear direction of the lamp). In the light shielding plate 340 disposed between the first light emitting element 320A and the second light emitting element 320B and the projection lens 330, a first opening 340Aa is formed on a rear side of the lamp of the first projection lens portion 332A. The light shielding plate 340 is provided with two second openings 340Bb and 340Bc formed on the near side of the lamp of the second projection lens portion 332B. The first light emitting element 320A is disposed on the rear side of the lamp of the first opening 340Aa. The second light emitting element 320B is disposed on the rear side of the lamp of the two second openings 340Bb and 340Bc.

The drawing light distribution pattern PAa2 can be formed in a long-distance region as a reverse projection image of the first opening 340Aa formed in the light shielding plate 340 by the emitted light from the first light emitting element 320A and incident on the first projection lens portion 332A. In addition, the two drawing light distribution patterns PAb2 and PAc2 can be formed in the short-distance region as reverse projection images of the two second openings 340Bb and 340Bc formed in the light shielding plate 340 by the emitted light from the second light emitting element 320B and incident on the second projection lens portion 332B.

At this time, in order to clearly form the drawing light distribution pattern PAa2 formed in the long-distance region, it is necessary to form a clear reverse projection image by the first opening 340Aa. On the other hand, in order to clearly form the drawing light distribution patterns PAb2 and PAc2 formed in the short-distance region, it is not necessary to form a very clear reverse projection image by the second openings 340Bb and 340Bc.

As in the present embodiment, the two drawing light distribution patterns PAb2 and PAc2 are formed in the short-distance region by the emitted light from the second light emitting element 320B and incident on the second projection lens portion 332B via the two second openings 340Bb and 340Bc formed in the light shielding plate 340. Therefore, the number of projection lens portions constituting the projection lens 330 can be reduced to two.

Accordingly, an arrangement space for the projection lens 330 can be easily secured. The drawing light distribution pattern PA2 including the three drawing light distribution patterns PAa2, PAb2, and PAc2 is formed with required sharpness. Accordingly, the reminder function to the surroundings can be enhanced.

As described above, according to the present embodiment, in the drawing lamp 310 configured to form the drawing light distribution pattern PA2, it is possible to form the drawing light distribution pattern PA2 having an excellent reminder function to the surroundings while easily securing the arrangement space of the projection lens 330.

Moreover, as in the present embodiment, the first projection lens portion 332A and the second projection lens portion 332B are integrally formed with the lens effective surfaces thereof adjacent to each other. Therefore, a size of the drawing lamp 310 can be further reduced. In addition, the projection lens 330 is viewed as a single lens. Accordingly, the design of the drawing lamp 310 can be improved.

The projection lens 330 according to the present embodiment is formed such that the first projection lens portion 332A is larger in size than the second projection lens portion 332B. Therefore, the drawing light distribution pattern PAa2 formed in the long-distance region is formed with substantially the same sharpness and brightness as the two drawing light distribution patterns PAb2 and PAc2 formed in the short-distance region. Accordingly, it is possible to enhance a reminder function to the surroundings by forming the drawing light distribution pattern PA2.

Further, in the light shielding plate 340 according to the present embodiment, two second openings 340Bb and 340Bc are aligned in the upper-lower direction. Therefore, the drawing light distribution patterns PAb2 and PAc2 can be formed at two places of far and near in the short-distance region. Accordingly, the drawing light distribution patterns PAa2, PAb2, and PAc2 can be formed in the long-distance region, the short-distance region, and the close-distance region as the drawing light distribution pattern PA2 as a whole. In the present embodiment, the drawing light distribution pattern PA is formed as a light distribution pattern in which the three drawing light distribution patterns PAa2, PAb2, and PAc2 are arranged in series at substantially equal intervals.

In the present embodiment, the first opening 340Aa and the two second openings 340Bb and 340Bc formed in the light shielding plate 340 are each formed to have a V-shaped opening shape. However, the first opening 340Aa and the two second openings 340Bb and 340Bc may be formed to have other opening shapes. For example, the first opening 340Aa and the two second openings 340Bb and 340Bc may be formed to have an opening shape such as a downward arrow or an inverted trapezoid.

In the present embodiment, emitted light from the first light emitting element 320A and the second light emitting element 320B is incident on the first opening 340Aa and the two second openings 340Bb and 340Bc via the first condenser lens 352A and the second condenser lens 352B. However, the emitted light from the first light emitting element 320A and the second light emitting element 320B may be directly incident on the first opening 340Aa and the two second openings 340Bb and 340Bc.

In the present embodiment, the first projection lens portion 332A and the second projection lens portion 332B are formed such that the optical axes Axa2 and Axb2 extend in the front-rear direction of the lamp at the same height position. However, the first projection lens portion 332A and the second projection lens portion 332B may be configured in other modes. For example, the first projection lens portion 332A and the second projection lens portion 332B may be formed such that the optical axis Axa2 of the first projection lens portion 332A extends upward from the optical axis Axb2 of the second projection lens portion 332B.

In the present embodiment, light emitting colors of the first light emitting element 320A and the second light emitting element 320B have been described as white, and may also adopt other light emitting colors (for example, amber, red, and the like).

In the present embodiment, the drawing lamp 310 is mounted on an end on a vehicle width direction side in a front end of the vehicle 400, and may be mounted on a rear end, a side surface portion, or the like of the vehicle 400.

In the present embodiment, the drawing light distribution pattern PA2 is formed on the road surface 302 in front of the vehicle by the irradiation light from the drawing lamp 310. However, the drawing light distribution pattern PA2 may be formed on a wall surface disposed in front of the lamp, a wall surface extending toward the front of the lamp, or the like.

Next, a modification of the second embodiment will be described.

First, a first modification of the second embodiment will be described.

Figure 20:
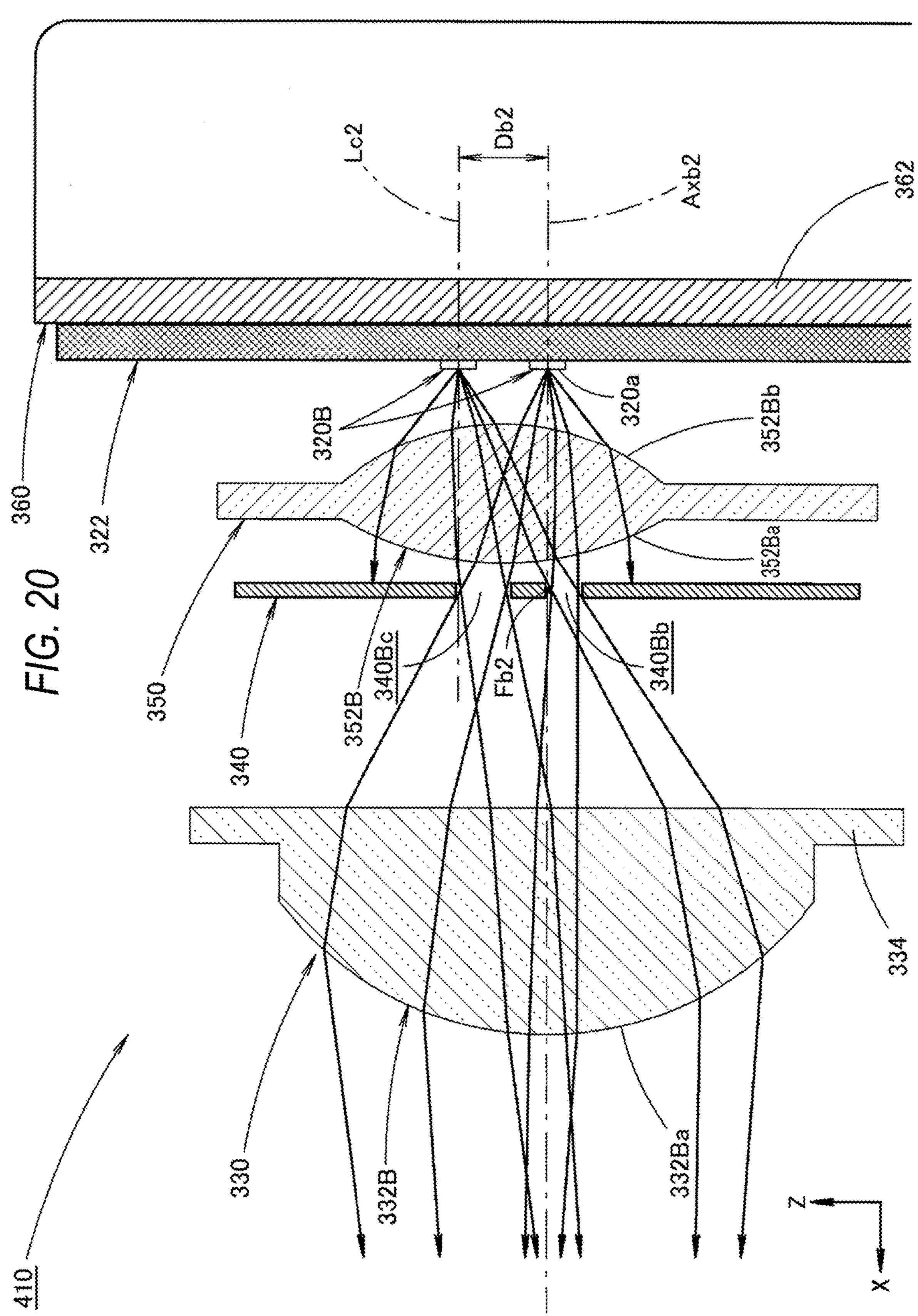
FIG. 20 is a cross-sectional view illustrating a drawing lamp according to a first modification of the second embodiment.

FIG. 20 is a cross-sectional view illustrating a drawing lamp 410 according to the first modification of the second embodiment. FIG. 20 illustrates the drawing lamp 410 viewed in the same cross section as FIG. 17.

As illustrated in FIG. 20, a basic configuration of the present modification is similar to that of the second embodiment, but the number and arrangement of the second light emitting elements 320B are partially different from those of the second embodiment.

That is, in the present modification, the second light emitting elements 320B are disposed on the rear side of the lamp of the two second openings 340Bb and 340Bc formed in the light shielding plate 340.

Specifically, the second light emitting element 320B disposed on the rear side of the lamp of the second opening 340Bb located on the lower side is disposed on the optical axis Axb2 of the second projection lens portion 332B. The second light emitting element 320B disposed on a rear side of the lamp of the second opening 340Bc located on an upper side is disposed such that a light emitting center is located on the third reference axis line Lc2. The third reference axis line Lc2 is located to pass through the lower end of the central portion of the upper inner peripheral edge of the second opening 340Bc. In the present modification, the two second light emitting elements 320B are disposed to be located on both upper and lower sides of the second light emitting element 320B according to the second embodiment.

Accordingly, in the present modification, emitted light from the second light emitting element 320B located on the lower side is efficiently incident on the second opening 340Bb located on the lower side via the second condenser lens 352B. Emitted light from the second light emitting element 320B located on the upper side efficiently is incident on the second opening 340Bc located on the upper side via the second condenser lens 352B.

By adopting the configuration of the present modification, an amount of light incident on the second projection lens portion 332B via the two second openings 340Bb and 340Bc is substantially doubled. Therefore, it is easy to ensure the brightness of the drawing light distribution patterns PAb2 and PAc2 (see FIGS. 18 and 19) formed in the short-distance region and the close-distance region.

Next, a second modification of the second embodiment will be described.

Figure 21:
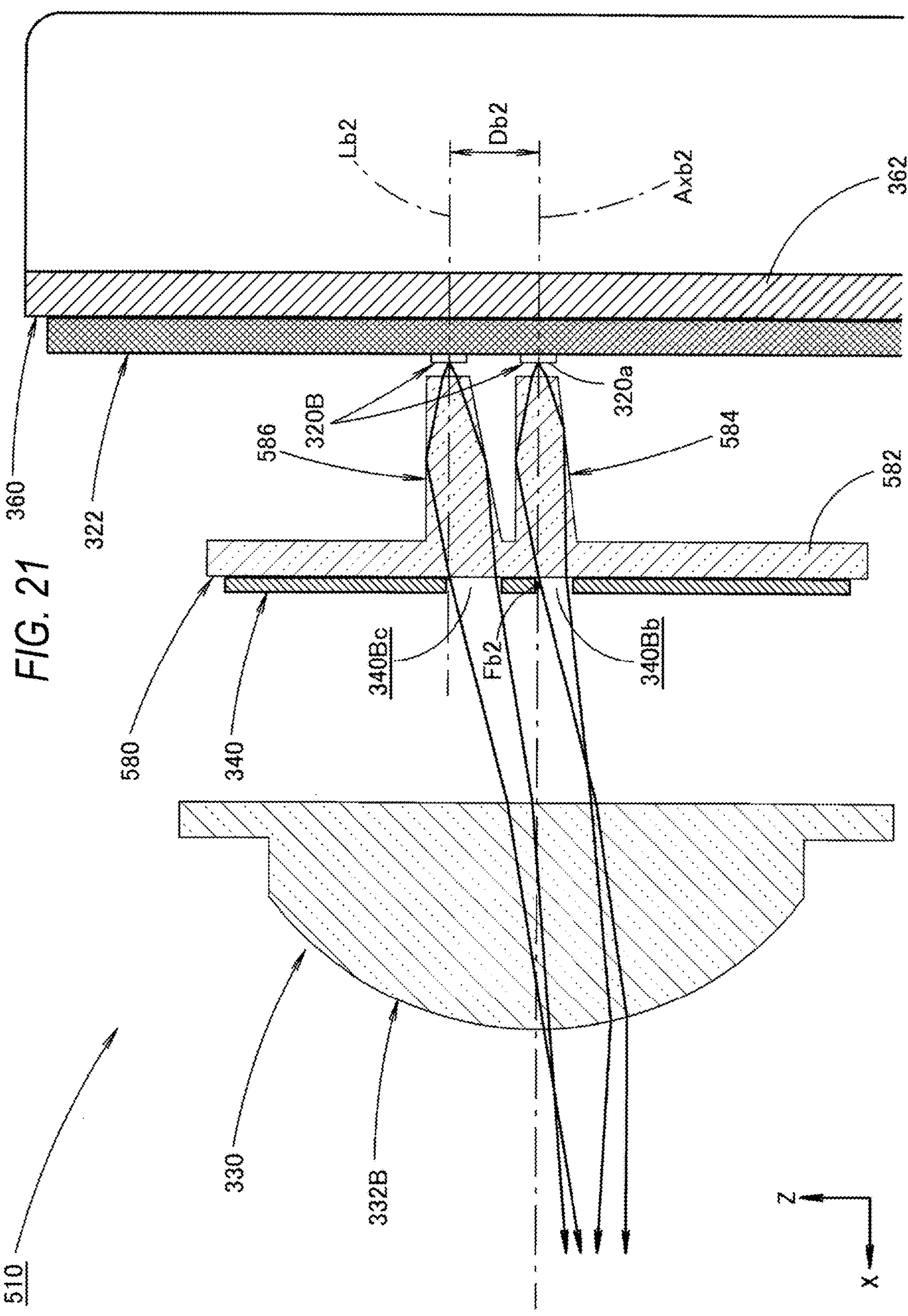
FIG. 21 is a cross-sectional view illustrating a drawing lamp according to a second modification of the second embodiment.

FIG. 21 is a cross-sectional view illustrating a drawing lamp 510 according to the second modification of the second embodiment. FIG. 21 illustrates the drawing lamp 510 viewed in the same cross section as FIG. 17.

As illustrated in FIG. 21, a basic configuration of the present modification is the same as that of the first modification, but the present modification is different from the first modification in that a light guide body 580 is disposed between the substrate 322 and the light shielding plate 340.

That is, in the present modification, instead of the condenser lens assembly 350 according to the first modification, the light guide body 580 is disposed between the substrate 322 and the light shielding plate 340. The light guide body 580 includes a plate-shaped portion 582 formed to extend along a rear surface of the light shielding plate 340, and light guide portions 584 and 586 formed to protrude toward the rear of the lamp from two upper and lower portions of a rear surface of a plate-shaped portion 582.

The light guide portion 584 located on a lower side is formed to expand from the second light emitting element 320B located on a lower side toward the second opening 340Bb located on a lower side. The light guide portion 584 is formed to have a trapezoidal shape in a vertical cross section. A rear end surface of the light guide portion 584 is located near a light emitting surface 320*a* of the second light emitting element 320B located on the lower side. A front end edge of the light guide portion 584 is connected to the plate-shaped portion 582 at a position surrounding the second opening 340Bb.

The light guide portion 586 located on an upper side is formed to expand from the second light emitting element 320B located on an upper side toward the second opening 340Bc located on an upper side. The light guide portion 586 is formed to have a trapezoidal shape in a vertical cross section. The rear end surface of the light guide portion 586 is located near the light emitting surface 320*a* of the second light emitting element 320B located on the upper side. A front end edge of the light guide portion 586 is connected to the plate-shaped portion 582 at a position surrounding the second opening 340Bc.

Accordingly, in the present modification, the emitted light from the second light emitting element 320B located on the lower side is incident on the light guide portion 584 from the rear end surface of the light guide portion 584, and then is incident on the second opening 340Bb directly or after being totally reflected by a peripheral wall surface of the light guide portion 584. In addition, the emitted light from the second light emitting element 320B located on the upper side is incident on the light guide portion 586 from the rear end surface of the light guide portion 586, and then is incident on the second opening 340Bc directly or after being totally reflected by a peripheral wall surface of the light guide portion 586.

By adopting the configuration according to the present modification, the following operations and effects can be obtained.

That is, the emitted light from the second light emitting element 320B located on the lower side is efficiently incident on the second opening 340Bb located on the lower side via the light guide portion 584. In addition, the emitted light from the second light emitting element 320B located on the upper side is efficiently incident on the second opening 340Bc located on the upper side via the light guide portion 586.

Therefore, in the present modification, similarly to the case of the first modification, an amount of light incident on the second projection lens portion 332B via the two second openings 340Bb and 340Bc also increases. Therefore, it is easy to ensure the brightness of the drawing light distribution patterns PAb2 and PAc2 (see FIGS. 18 and 19) formed in the short-distance region and the close-distance region.

Moreover, in the present modification, emitted light from the second light emitting element 320B located on the lower side is less likely to be incident on the second opening 340Bc located on the upper side. Further, emitted light from the second light emitting element 320B located on the upper side is less likely to be incident on the second opening 340Bb located on the lower side. Therefore, when the second light emitting element 320B located on the lower side and the second light emitting element 320B located on the upper side are individually turned on, the drawing light distribution patterns PAb2 and PAc2 (see FIGS. 18 and 19) are individually formed. Therefore, it is possible to select a mode in which the three drawing light distribution patterns PAa2, PAb2, and PAc2 are simultaneously formed as the drawing light distribution pattern PA2 and a mode in which the three drawing light distribution patterns PAa2, PAb2, and PAc2 are individually formed.

Next, a third modification of the second embodiment will be described.

Figure 22:
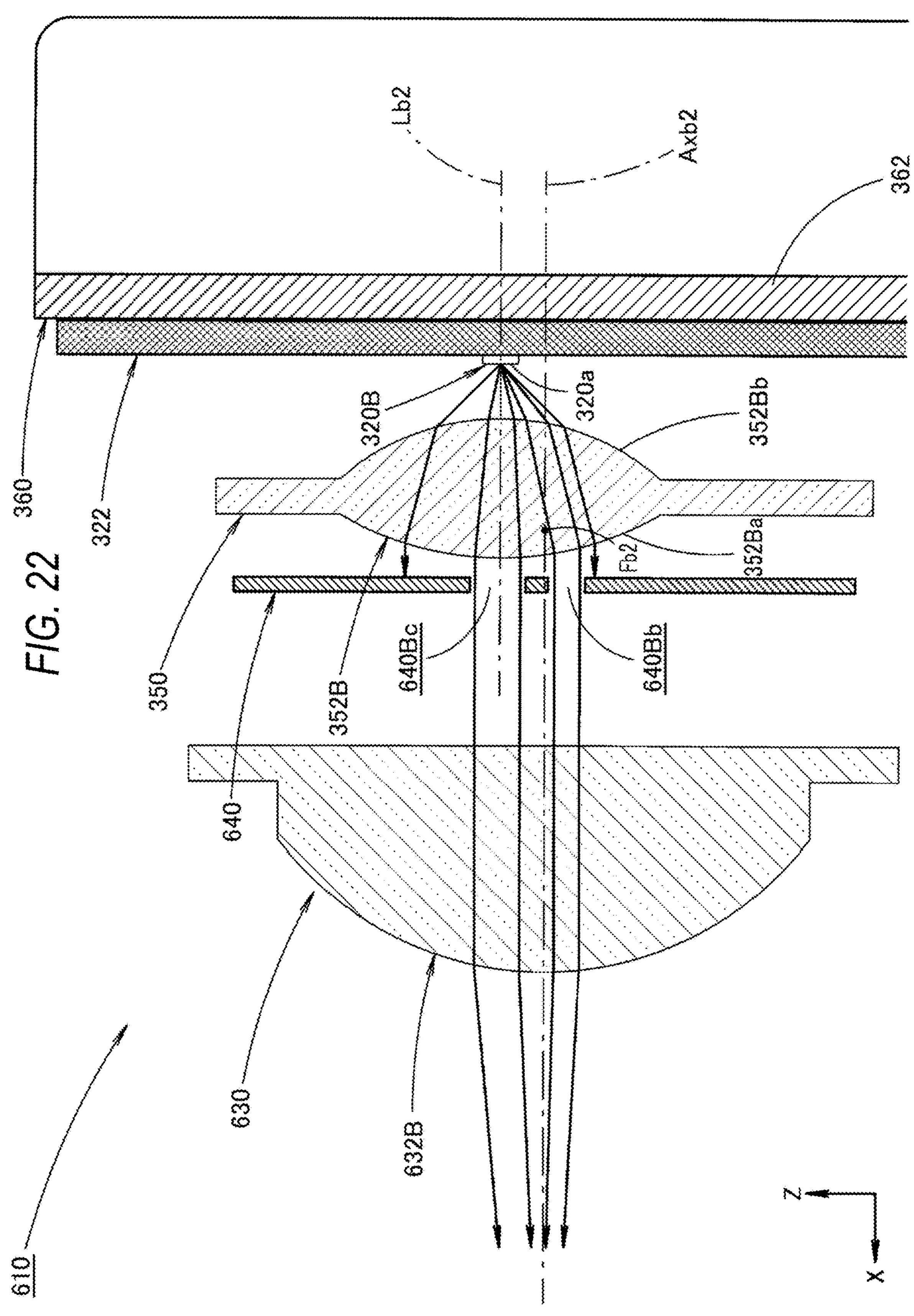
FIG. 22 is a cross-sectional view illustrating a drawing lamp according to a third modification of the second embodiment.

FIG. 22 is a cross-sectional view illustrating a drawing lamp 610 according to the third modification of the second embodiment. FIG. 22 is a cross-sectional view of the drawing lamp 610 viewed in the same cross section as FIG. 17.

As illustrated in FIG. 22, a basic configuration of the present modification is similar to that of the second embodiment, but configurations of a projection lens 630 and a light shielding plate 640 are partially different from those of the second embodiment.

That is, also in the present modification, the projection lens 630 includes a second projection lens portion 632B formed to have the same shape as that of the second embodiment. As compared with the case of the second embodiment, the second projection lens portion 632B is disposed at a position displaced to the rear side of the lamp. Accordingly, the rear focus Fb2 is located on a rear side of the lamp of the light shielding plate 640.

Also in this modification, two second openings 640Bb and 640Bc having the same shape as in the second embodiment are formed in the light shielding plate 640. The two second openings 640Bb and 640Bc are disposed at positions displaced on the lower side as compared with the case of the second embodiment. At this time, a distance by which the second opening 640Bc located on the upper side is displaced downward with respect to the second opening 340Bc according to the second embodiment is larger than a distance by which the second opening 640Bb is displaced downward with respect to the second opening 340Bb according to the second embodiment.

Figure 23:
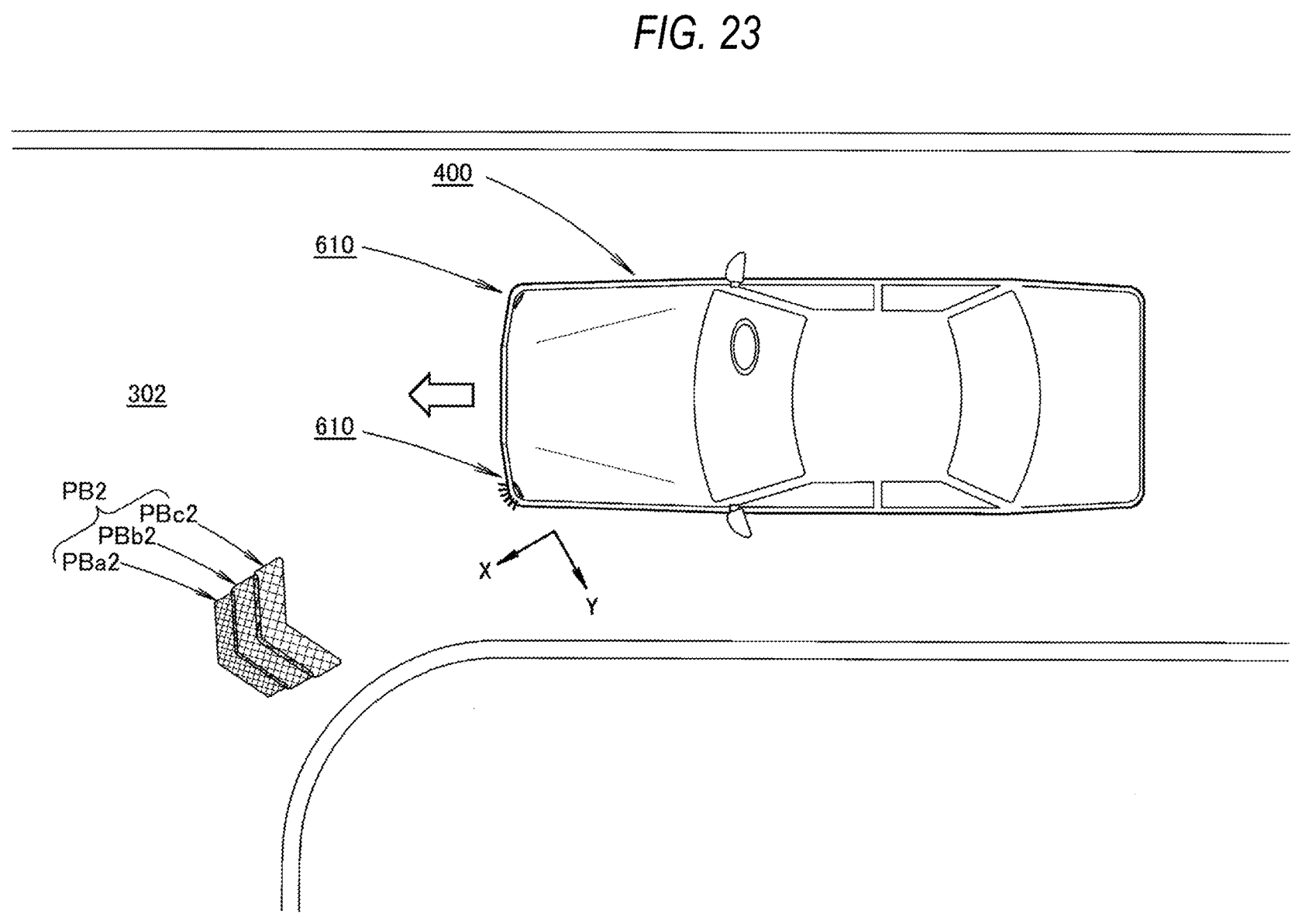

FIG. 23 is a plan view illustrating a state where drawing lamps 610 according to a third modification of the second embodiment is mounted on the vehicle 400. FIG. 23 is a plan view seen from the same viewpoint as FIG. 19.

As illustrated in FIG. 23, in the present modification, a drawing light distribution pattern PB2 including three drawing light distribution patterns PBa2, PBb2, and PBc2 is formed by irradiation light from the drawing lamp 610.

At this time, the drawing light distribution pattern PBa2 is formed as a light distribution pattern similar to the drawing light distribution pattern PAa2 according to the second embodiment. However, the drawing light distribution patterns PBb2 and PBc2 are formed as light distribution patterns in a state of being displaced to the farther side from the drawing light distribution patterns PBb2 and PBc2 according to the second embodiment and having slightly blurred contours. Accordingly, the drawing light distribution pattern PB2 is formed as a single light distribution pattern in a state where the three drawing light distribution patterns PBa2, PBb2, and PBc2 slightly overlap each other.

The reason why the drawing light distribution pattern PB2 is formed as such a light distribution pattern is as follows.

That is, the emitted light from the second light emitting element 320B is incident on the second condenser lens 352B via the second opening 640Bb located on a lower side, and then is emitted from the second condenser lens 352B as light slightly upward as compared with the case of the second embodiment. Accordingly, the drawing light distribution pattern PBb2 is formed slightly farther than the drawing light distribution pattern PAb2 according to the second embodiment.

Further, the emitted light from the second light emitting element 320B is incident on the second condenser lens 352B via the second opening 640Bc located on an upper side, and then is emitted from the second condenser lens 352B as light considerably upward as compared with the case of the above embodiment. Accordingly, the drawing light distribution pattern PBc2 is formed considerably farther than the drawing light distribution pattern PAc2 according to the second embodiment.

Further, the drawing light distribution patterns PBb2 and PBc2 are formed as reverse projection images of the second openings 640Bb and 640Bc having blurred contours.

By adopting the configuration of the present modification as described above, the drawing light distribution pattern PB2 can be formed as a single light distribution pattern in a state where the three drawing light distribution patterns PBa2, PBb2, and PBc2 slightly overlap each other.

The drawing lamp according to the second embodiment and the modifications thereof may be an on-vehicle lamp or a lamp used for a purpose other than the on-vehicle purpose.

A specific shape of each of the first projection lens portion for long-distance drawing and the second projection lens portion for short-distance drawing is not particularly limited as long as the "projection lens" is disposed in a state where the first projection lens portion and the second projection lens portion are aligned in the required direction intersecting with the front-rear direction of the lamp.

A specific direction of the "required direction intersecting the front-rear direction of the lamp" is not particularly limited, and can adopt, for example, a left-right direction or an upper-lower direction.

A specific drawing position of each of the "first projection lens portion for long-distance drawing" and the "second projection lens portion for short-distance drawing" is not particularly limited as long as the drawing light distribution pattern formed by the second projection lens portion is configured to be positioned in the short-distance region more than the drawing light distribution pattern formed by the irradiation light from the first projection lens portion.

The specific arrangement of the "light shielding plate" is not particularly limited as long as the light shielding plate is configured to shield a part of light traveling from the light emitting element to the projection lens between the light emitting element and the projection lens.

A specific formation position and opening shape of the "first opening" are not particularly limited as long as the "first opening" is disposed on a rear side of the lamp of the first projection lens portion.

A specific formation position and opening shape of each of the "plurality of second openings" are not particularly limited as long as the "plurality of second openings" are disposed on a rear side of the lamp of the second projection lens portion, and the number of the second openings to be disposed is not particularly limited.

A specific arrangement and the number of the "first light emitting elements" are not particularly limited as long as the "first light emitting elements" are disposed on the rear side of the lamp of the first opening.

A specific arrangement and the number of the "second light emitting elements" are not particularly limited as long as the "second light emitting elements" are disposed on the rear side of the lamp of the plurality of second openings.

Numerical values shown as specifications in the first embodiment, the second embodiment, and the modifications thereof are merely examples, and as a matter of course, these numerical values may be set to different values as appropriate.

Further, the present disclosure is not limited to the configurations described in the first embodiment, the second embodiment, and the modifications thereof, and a configuration added with various other changes may be adopted.

Contents disclosed in a Japanese patent application (JP2022-150307) filed on Sep. 21, 2022 and a Japanese patent application (JP2022-150308) filed on Sep. 21, 2022 are appropriately incorporated in the present application.

The invention claimed is:

1. A drawing lamp for forming a drawing light distribution pattern by emitting emitted light from a light emitting element toward a front of the lamp via a projection lens, the drawing lamp comprising:

the projection lens;

the light emitting element; and a light shielding plate disposed between the light emitting element and the projection lens, the light shielding plate being configured to shield a part of light traveling from the light emitting element to the projection lens, wherein:

in the projection lens, a first projection lens portion for long-distance drawing and a second projection lens portion for short-distance drawing are integrally formed in a state where the first projection lens portion and the second projection lens portion are aligned in a required direction intersecting a front-rear direction of the lamp and in a state where lens effective surfaces of the first projection lens portion and the second projection lens portion are adjacent to each other, a first opening and a second opening are formed in portions of the light shielding plate on a rear side of the lamp of the first projection lens portion and the second projection lens portion, and the light emitting element includes a first light emitting element and a second light emitting element that are disposed on a rear side of the lamp of the first opening and the second opening, and the projection lens is formed such that the first projection lens portion is larger in size than the second projection lens portion.

2. The drawing lamp according to claim 1, wherein the projection lens includes a third projection lens portion for close-distance drawing, the third projection lens portion is integrally formed with at least one of the first projection lens portion and the second projection lens portion in a state where lens effective surfaces of the third projection lens portion are adjacent to a lens effective surface of at least one of the first projection lens portion and the second projection lens portion, a third opening is formed in a portion of the light shielding plate on a rear side of the lamp of the third projection lens portion, and the light emitting element includes a third light emitting element disposed on a rear side of the lamp of the third opening.

3. The drawing lamp according to claim 1, wherein a plurality of light emitting elements are disposed, as the first light emitting element.

4. The drawing lamp according to claim 3, wherein a condenser lens for causing emitted light from the plurality of light emitting elements configuring the first light emitting element to be incident on the first opening is disposed between the first light emitting element and the light shielding plate.

5. A drawing lamp for forming a drawing light distribution pattern by emitting emitted light from a light emitting element toward a front of the lamp via a projection lens, the drawing lamp comprising:

the projection lens;

the light emitting element; and a light shielding plate is disposed between the light emitting element and the projection lens, the light shielding plate being configured to shield a part of light traveling from the light emitting element to the projection lens, wherein:

in the projection lens, a first projection lens portion for long-distance drawing and a second projection lens portion for short-distance drawing is disposed in a state where the first projection lens portion and a second projection lens portion are aligned in a required direction intersecting the front-rear direction of the lamp, a plurality of openings are formed in the light shielding plate, the light shielding plate includes, as the plurality of openings, a first opening disposed on a rear side of the lamp of the first projection lens portion, and a plurality of second openings disposed on a rear side of the lamp of the second projection lens portion, and the light emitting element includes a first light emitting element disposed on a rear side of the lamp of the first opening, and a second light emitting element disposed on a rear side of the lamp of the plurality of second openings, and the first projection lens portion is formed to have a larger size than the second projection lens portion.

6. The drawing lamp according to claim 5, wherein the plurality of second openings are aligned in an upper-lower direction.

7. The drawing lamp according to claim 5, wherein the second light emitting element is disposed on a rear side of the lamp of each of the plurality of second openings.

8. The drawing lamp according to claim 5, wherein the plurality of openings are formed in a positional relationship in which each of a plurality of drawing light distribution patterns formed by the light passing through the plurality of second openings and a drawing light distribution pattern formed by the light passing through the first opening partially overlap each other.

9. The drawing lamp according to claim 6, wherein the second light emitting element is disposed on a rear side of the lamp of each of the plurality of second openings.

10. The drawing lamp according to claim 6, wherein the plurality of openings are formed in a positional relationship in which each of a plurality of drawing light distribution patterns formed by the light passing through the plurality of second openings and a drawing light distribution pattern formed by the light passing through the first opening partially overlap each other.

* * * * *